US011735768B2

(12) United States Patent
Frieberg

(10) Patent No.: US 11,735,768 B2
(45) Date of Patent: Aug. 22, 2023

(54) GEL ELECTROLYTE FOR SOLID-STATE BATTERY

(71) Applicant: GM GLOBAL TECHNOLOGY OPERATIONS LLC, Detroit, MI (US)

(72) Inventor: Bradley R. Frieberg, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 146 days.

(21) Appl. No.: 17/171,489

(22) Filed: Feb. 9, 2021

(65) Prior Publication Data

US 2022/0255130 A1 Aug. 11, 2022

(51) Int. Cl.
*H01M 10/0565* (2010.01)
*H01M 10/0525* (2010.01)
(Continued)

(52) U.S. Cl.
CPC ....... *H01M 10/0565* (2013.01); *H01M 4/133* (2013.01); *H01M 4/621* (2013.01);
(Continued)

(58) Field of Classification Search
CPC ......... H01M 10/0525; H01M 10/0562; H01M 10/0565; H01M 2300/0068; H01M 2300/0082; H01M 4/133; H01M 4/621
See application file for complete search history.

(56) References Cited

U.S. PATENT DOCUMENTS 10,714,756 B2   7/2020  Dai et al.
11,121,375 B2   9/2021  Hou et al.
(Continued)

FOREIGN PATENT DOCUMENTS

CN    108039511 A  *  5/2018  .......... H01M 10/052
CN    114914531 A     8/2022
(Continued)

OTHER PUBLICATIONS

Machine Translation CN108039511A (Year: 2018).*
(Continued)

*Primary Examiner* — Victoria H Lynch
(74) *Attorney, Agent, or Firm* — Harness, Dickey & Pierce, P.L.C.

(57) ABSTRACT

The present disclosure relates to solid-state batteries and methods for forming solid-state batteries. The method includes contacting a polymeric precursor and an assembled battery including two or more electrodes defining a space therebetween, where the polymeric precursor fills the space defined between the two or more electrodes and any voids between the solid-state electroactive particles of each electrode; and reacting the polymeric precursor to form a polymeric gel electrolyte that forms a solid-state electrolyte layer in the space between the two or more electrodes and fills the voids between the solid-state electroactive particles of the electrodes. In other instances the method includes disposing the polymeric precursor on exposed surfaces of an electrode and reacting the polymeric precursor to form the solid-state electrolyte. In still other instances, the method includes disposing the polymeric precursor on a releasable film and reacting the polymeric precursor to form the free-standing electrolyte layer.

13 Claims, 14 Drawing Sheets

(51) Int. Cl.
  *H01M 10/0562* (2010.01)
  *H01M 4/62* (2006.01)
  *H01M 4/133* (2010.01)
(52) U.S. Cl.
  CPC ... *H01M 10/0525* (2013.01); *H01M 10/0562* (2013.01); *H01M 2300/0068* (2013.01); *H01M 2300/0082* (2013.01)

(56) References Cited

U.S. PATENT DOCUMENTS

| | | | |
|---|---|---|---|
| 11,145,922 B2 | 10/2021 | Li et al. | |
| 11,205,798 B2 | 12/2021 | Li et al. | |
| 11,217,826 B2 | 1/2022 | Li et al. | |
| 11,295,901 B2 | 4/2022 | Hou et al. | |
| 2002/0076617 A1* | 6/2002 | Kezuka | H01M 4/133 429/231.1 |
| 2004/0122178 A1* | 6/2004 | Huang | H01M 10/0565 429/313 |
| 2012/0321962 A1* | 12/2012 | Kajita | H01M 4/0445 429/300 |
| 2013/0149616 A1 | 6/2013 | Lee et al. | |
| 2017/0317352 A1 | 11/2017 | Lee et al. | |
| 2020/0036070 A1 | 1/2020 | Li et al. | |
| 2020/0119357 A1 | 4/2020 | Hou et al. | |
| 2020/0127282 A1* | 4/2020 | Yersak | H01M 10/0525 |
| 2020/0203757 A1 | 6/2020 | Park et al. | |
| 2020/0403267 A1 | 12/2020 | Li et al. | |
| 2021/0020929 A1 | 1/2021 | Kong et al. | |
| 2021/0028481 A1 | 1/2021 | Hou et al. | |
| 2021/0036310 A1 | 2/2021 | Hou et al. | |
| 2021/0036360 A1 | 2/2021 | Li et al. | |
| 2021/0050157 A1 | 2/2021 | Hou et al. | |
| 2021/0050596 A1 | 2/2021 | Li et al. | |
| 2021/0057776 A1 | 2/2021 | Lu et al. | |
| 2021/0066746 A1 | 3/2021 | Hou et al. | |
| 2021/0111426 A1 | 4/2021 | Li et al. | |
| 2021/0111435 A1* | 4/2021 | Higashi | H01M 4/139 |
| 2021/0135224 A1 | 5/2021 | Hou et al. | |
| 2021/0367224 A1 | 11/2021 | Gaben | |
| 2022/0102756 A1 | 3/2022 | Frieberg et al. | |
| 2022/0123352 A1 | 4/2022 | Li et al. | |
| 2022/0140422 A1 | 5/2022 | Chen et al. | |
| 2022/0166031 A1 | 5/2022 | Li et al. | |
| 2022/0181598 A1 | 6/2022 | Lu et al. | |
| 2022/0181685 A1 | 6/2022 | Li et al. | |
| 2022/0263055 A1 | 8/2022 | Hou et al. | |
| 2022/0263129 A1 | 8/2022 | Lu et al. | |
| 2022/0302526 A1 | 9/2022 | Li et al. | |

FOREIGN PATENT DOCUMENTS

| | | | |
|---|---|---|---|
| DE | 102016015191 B3 | 6/2018 | |
| DE | 102018203466 A1 | 9/2019 | |
| DE | 102019115643 A1 | 4/2020 | |
| DE | 102021130557 A1 | 8/2022 | |
| KR | 20080107291 A * | 12/2008 | ............ H01M 10/04 |

OTHER PUBLICATIONS

Machine Translation KR20080107291A (Year: 2008).*

Yong Lu et al.; U.S. Appl. No. 17/543,160, filed Dec. 6, 2021, entitled "Solid State Battery with Uniformly Distributed Electrolyte, and Methods of Fabrication Relating Thereto"; 64 pages.

Mengyan Hou et al.; U.S. Appl. No. 17/550,507, filed Dec. 14, 2021, entitled "Bipolar Solid-State Battery with Enhanced Interfacial Contact"; 61 pages.

Bradley R. Frieberg et al.; U.S. Appl. No. 17/551,753, filed Dec. 15, 2021, entitled "Solid Electrolyte Coating of Lithium-Doped Silicon Oxide Particles as Anode Active Material"; 39 pages.

Qili Su et al.; U.S. Appl. No. 17/560,673, filed Dec. 23, 2021, entitled "Folded Bipolar Battery Design"; 45 pages.

Yong Lu et al.; U.S. Appl. No. 17/696,567, filed Mar. 16, 2022, entitled "Designs of High-Power Gel-Assisted Bipolar Solid-State Battery"; 64 pages.

Zhe Li et al.; U.S. Appl. No. 17/738,767, filed May 6, 2022, entitled "Gel Polymer Electrolyte for Electrochemical Cell"; 38 pages.

Zhe Li et al.; U.S. Appl. No. 17/746,575, filed May 17, 2022, entitled "Lithiation Additive for Solid-State Battery Including Gel Electrolyte"; 71 pages.

Jingyuan Liu et al.; U.S. Appl. No. 17/542,974, filed Dec. 6, 2021, entitled "Bipolar Capacitor Assisted Battery"; 31 pages.

Zhe Li et al.; U.S. Appl. No. 17/542,299, filed Dec. 3, 2021, entitled "In-Situ Gelation Method to Make a Bipolar Solid-State Battery"; 60 pages.

Yong Lu et al.; U.S. Appl. No. 17/556,175, filed Dec. 20, 2021, entitled "Non-Flammable Solvate Ionic Liquid Electrolyte With Diluters"; 59 pages.

Zhe Li et al.; U.S. Appl. No. 17/683,976, filed Mar. 1, 2022, entitled "Self-Heating Bipolar Solid-State Battery"; 72 pages.

Qili Su et al.; U.S. Appl. No. 17/688,445, filed Mar. 7, 2022, entitled "Methods of Fabricating Bipolar Solid State Batteries"; 77 pages.

Qili Su et al.; U.S. Appl. No. 17/697,135, filed Mar. 17, 2022, entitled "Methods of Manufacturing Bipolar Solid-State Batteries"; 77 pages.

Qi Lu et al.; U.S. Appl. No. 17/698,865, filed Mar. 18, 2022, entitled "Bipolar Current Collector and Method of Making The Same"; 48 pages.

Zhe Li et al.; U.S. Appl. No. 17/707,524, filed Mar. 29, 2022, entitled "Argyrodite Solid Electrolytes for Solid-State Batteries and Methods of Making The Same"; 56 pages.

Qili Su et al.; U.S. Appl. No. 17/710,900, filed Mar. 31, 2022, entitled "Gel Electrolyte System for Solid State Battery"; 76 pages.

Zhe Li et al.; U.S. Appl. No. 17/458,903, filed Aug. 27, 2021, entitled "Anode-Free Solid-State Battery and Method of Battery Fabrication", 28 pages.

Qili Su et al.; U.S. Appl. No. 17/710,213, filed Mar. 31, 2022, entitled Polymeric Gel Electrolyte Systems for High-Power Solid-State Battery; 62 pages.

Hou, Mengyan et al., U.S. Appl. No. 16/541,811, filed Aug. 15, 2019 entitled, "Hybrid Electrode Materials for Bipolar Capacitor-Assisted Solid-State Batteries," 41 pages.

Hou, Mengyan et al., U.S. Appl. No. 17/084,782, filed Oct. 30, 2020 entitled, "Capacitor-Assisted Electrochemical Devices Having Hybrid Structures," 59 pages.

Li, Zhe et al., U.S. Appl. No. 16/786,469, filed Feb. 10, 2020 entitled, "Solid-State Electrolytes and Methods for Making the Same," 42 pages.

Lu, Yong et al., U.S. Appl. No. 16/544,992, filed Aug. 20, 2019 entitled, "Solid-State Battery With Solid Electrolyte Surface Topography Design," 30 pages.

First Office Action for German Patent Application No. 10 2022 111 248.9 dated Nov. 29, 2022, with correspondence from Manitz Finsterwald Patent- und Rechtsanwaltspartnerschaft mbB summarizing Office Action; 7 pages.

* cited by examiner

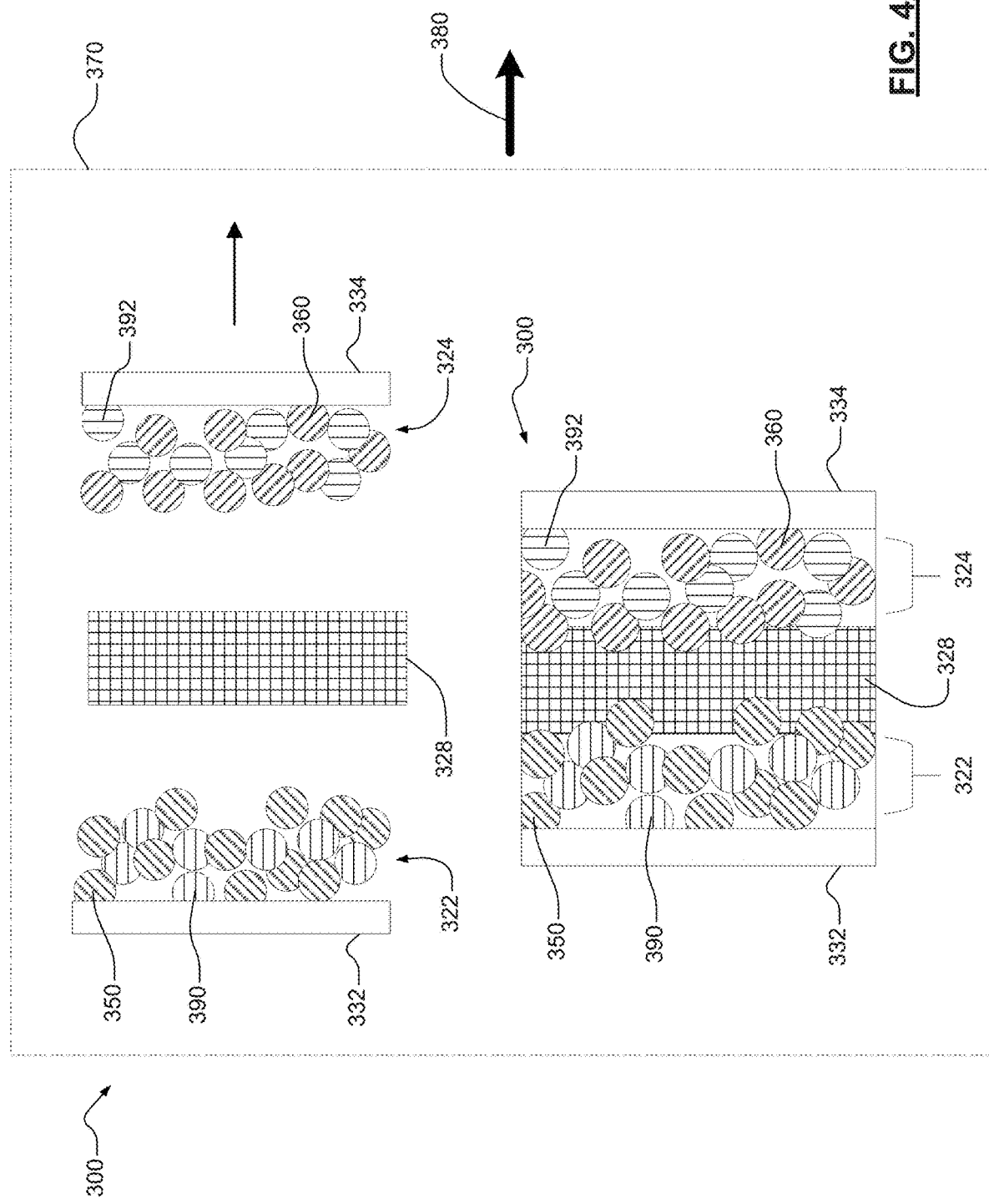

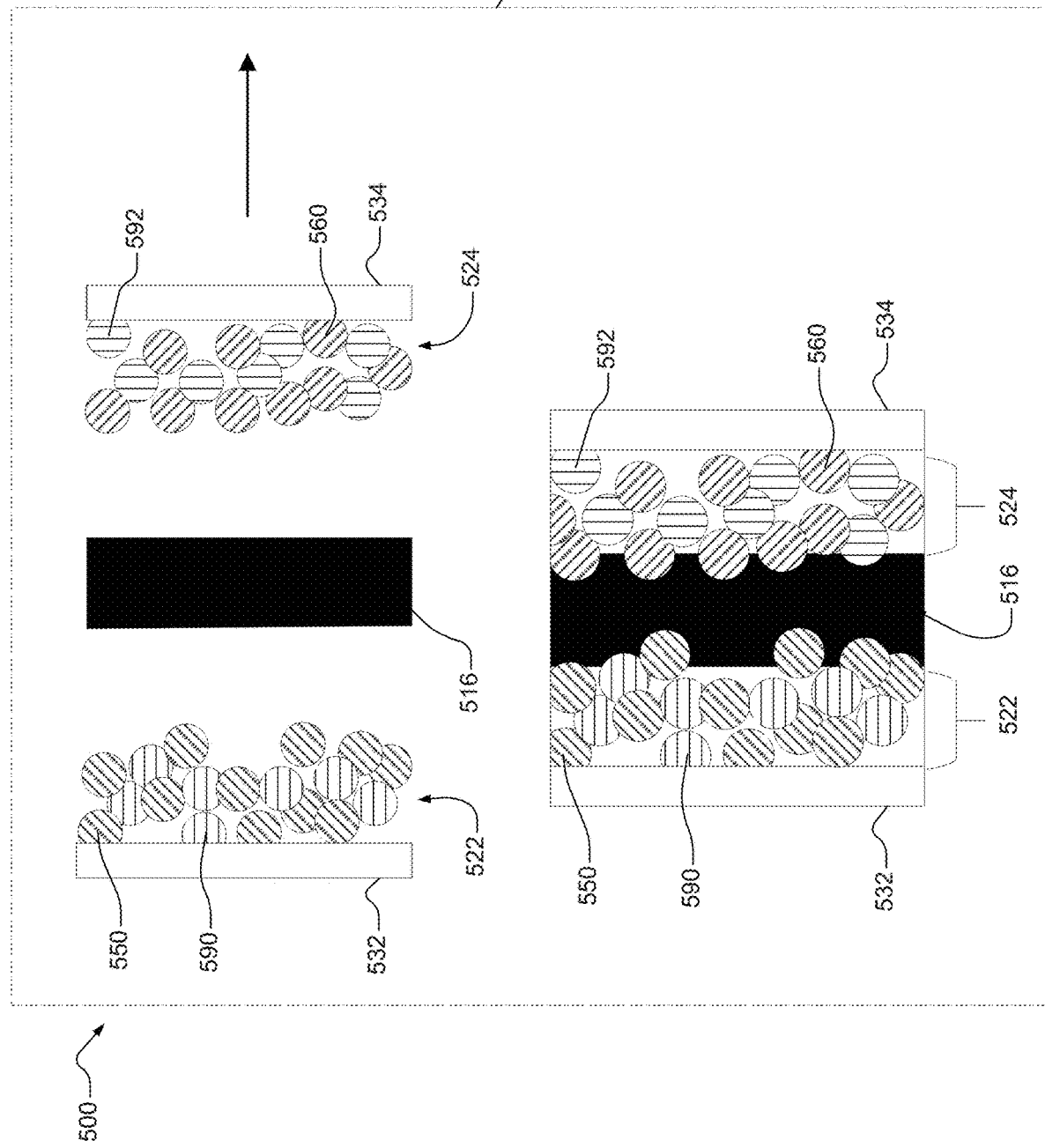

GEL ELECTROLYTE FOR SOLID-STATE BATTERY

INTRODUCTION

This section provides background information related to the present disclosure which is not necessarily prior art.

Electrochemical energy storage devices, such as lithium-ion batteries, can be used in a variety of products, including automotive products such as start-stop systems (e.g., 12V start-stop systems), battery-assisted systems ("µBAS"), Hybrid Electric Vehicles ("HEVs"), and Electric Vehicles ("EVs"). Typical lithium-ion batteries include two electrodes and an electrolyte component and/or separator. One of the two electrodes can serve as a positive electrode or cathode, and the other electrode can serve as a negative electrode or anode. Lithium-ion batteries may also include various terminal and packaging materials. Rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions between the electrodes and, like the two electrodes, may be in a solid form, a liquid form, or a solid-liquid hybrid form. In the instances of solid-state batteries, which includes a solid-state electrolyte layer disposed between solid-state electrodes, the solid-state electrolyte physically separates the solid-state electrodes so that a distinct separator is not required.

Solid-state batteries have advantages over batteries that include a separator and a liquid electrolyte. These advantages can include a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, solid-state batteries generally experience comparatively low power capabilities. For example, such low power capabilities may be a result of interfacial resistance within the solid-state electrodes and/or at the electrode, and solid-state electrolyte layer interfacial resistance caused by limited contact, or void spaces, between the solid-state active particles and/or the solid-state electrolyte particles. Accordingly, it would be desirable to develop high-performance solid-state battery designs, materials, and methods that improve power capabilities, as well as energy density.

SUMMARY

This section provides a general summary of the disclosure, and is not a comprehensive disclosure of its full scope or all of its features.

The present disclosure relates to solid-state batteries, for example to bipolar solid-state batteries exhibiting enhanced interfacial contact, and to methods for forming bipolar solid-state batteries exhibiting enhanced interfacial contact using a polymeric gel electrolyte.

In various aspects, the present disclosure provides a method for forming a solid-state battery having a continuous solid-state electrolyte network. The method may include contacting a polymeric precursor including a crosslinkable polymer and an assembled battery including two or more electrodes defining a space therebetween, where each electrode includes a plurality of solid-state electroactive particles. The polymeric precursor fills the space between the two or more electrodes and any voids between the solid-state electroactive particles of each electrode. The method also includes reacting the polymeric precursor to form a polymeric gel electrolyte that forms a solid-state electrolyte layer in the space between the two or more electrodes and fills the voids between the solid-state electroactive particles of each electrode so as to form the continuous solid-state electrolyte network.

In one aspect, the polymeric precursor may include greater than or equal to about 5 wt. % to less than or equal to about 50 wt. % of the crosslinkable polymer.

In one aspect, the crosslinkable polymer may be selected from the group consisting of: polypropylene glycol diamine, polyethylene glycol diamine, polypropylene glycol diepoxy, polyethylene glycol diepoxy, and combinations thereof.

In one aspect, the crosslinkable polymer may include a first polymer and a second polymer and a molar ratio of the first polymer to the second polymer may be 1:2.

In one aspect, the first polymer may be selected from the group consisting of: polypropylene glycol diamine, polyethylene glycol diamine, copolymers and combinations thereof.

In one aspect, the second polymer may be selected from the group consisting of: polypropylene glycol diepoxy, polyethylene glycol diepoxy, copolymers and combinations thereof.

In one aspect, the polymeric precursor may further include greater than or equal to about 45 wt. % to less than or equal to about 80 wt. % of a plasticizer.

In one aspect, the plasticizer may be selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), and combinations thereof.

In one aspect, the polymeric precursor may further include greater than or equal to about 5 wt. % to less than or equal to about 30 wt. % of a lithium salt.

In one aspect, the lithium salt may be selected from the group consisting of: lithium tetrafluoroborate ($LiBF_4$), lithium perchlorate ($LiClO_4$), lithium hexafluorophosphate ($LiPF_6$), lithium hexafluoroarsenate ($LiAsF_6$), lithium trifluoromethanesulfonate (LiTf), lithium bis(fluorosulfonyl)imide (LiFSI), lithium bis(trifluoromethanesulfonyl)imide (LiTFSI), lithium bis(oxalato)borate (LiBOB), and combinations thereof.

In one aspect, the two or more electrodes include a first electrode and a second electrode. The first electrode may include a first plurality of solid-state electroactive material particles and a first plurality of solid-state electrolyte particles. The second electrode may include a second plurality of solid-state electroactive material particles and a second plurality of solid-state electrolyte particles. The polymeric precursor and the polymeric gel electrolyte may fill the voids between the first plurality of solid-state electroactive material particles and the first plurality of solid-state electrolyte particles and the second plurality of solid-state electroactive material particles and the second plurality of solid-state electrolyte particles.

In one aspect, a plurality of solid-state electrolyte particles are disposed in the space between the two or more electrodes and the polymeric precursor may fill the voids between the solid-state electrolyte particles to form the solid-state electrolyte layer.

In one aspect, a non-woven mat may be disposed in the space between the two or more electrodes, and the polymeric precursor may fills the pores in the non-woven mat so as to form the solid-state electrolyte layer.

In one aspect, the non-woven mat may have a thickness greater than or equal to about 10 μm to less than or equal to about 50 μm and a basis weight greater than or equal to about 5 g/m$^2$ to less than or equal to about 15 g/m$^2$.

In various aspects, the present disclosure provides a method for forming a solid-state electrolyte. The method may include disposing a polymeric precursor on exposed surfaces of an electrode and reacting the polymeric precursor to form the solid-state electrolyte. The polymeric precursor may include greater than or equal to about 5 wt. % to less than or equal to about 50 wt. % of a crosslinkable polymer, greater than or equal to about 45 wt. % to less than or equal to about 80 wt. % of a plasticizer, and greater than or equal to about 5 wt. % to less than or equal to about 30 wt. % of a lithium salt.

In one aspect, a non-woven mat may be disposed on a surface of the electrode and disposing a polymeric precursor on the exposed surfaces of the electrode may include filling pores in the non-woven mat.

In one aspect, a plurality of solid-state electrolyte particles may be disposed on a surface of the electrode and disposing a polymeric precursor on the exposed surfaces of the electrode may include filling the voids between the solid-state electrolyte particles.

In one aspect, the electrode may include a plurality of solid-state electroactive material particles and the polymeric precursor may also fills voids between the solid-state electroactive material particles so as to form a continuous solid-state electrolyte network.

In one aspect, the electrode may include a plurality of solid-state electrolyte particles and the polymeric precursor may fill any void between the solid-state electroactive material particles and the solid-state electrolyte particles.

In one aspect, the crosslinkable polymer may be selected from the group consisting of: polypropylene glycol diamine, polyethylene glycol diamine, polypropylene glycol diepoxy, polyethylene glycol diepoxy, copolymers and combinations thereof.

In one aspect, the plasticizer may be selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), combinations thereof.

In one aspect, the lithium salt may be selected from the group consisting of: lithium tetrafluoroborate (LiBF$_4$), lithium perchlorate (LiClO$_4$), lithium hexafluorophosphate (LiPF$_6$), lithium hexafluoroarsenate (LiAsF$_6$), lithium trifluoromethanesulfonate (LiTf), lithium bis(fluorosulfonyl)imide (LiFSI), lithium bis(trifluoromethanesulfonyl)imide (LiTFSI), lithium bis(oxalato)borate (LiBOB) and combinations thereof.

In various aspects, the present disclosure provides a method for forming a free-standing, solid-state electrolyte layer. The method may include disposing a polymeric precursor on a releasable film and reacting the polymeric precursor to form the free-standing, solid-state electrolyte layer. The polymeric precursor may include greater than or equal to about 5 wt. % to less than or equal to about 50 wt. % of a crosslinkable polymer, greater than or equal to about 45 wt. % to less than or equal to about 80 wt. % of a plasticizer, and greater than or equal to about 5 wt. % to less than or equal to about 30 wt. % of a lithium salt.

In one aspect, a non-woven mat may be disposed on the releasable film and disposing a polymeric precursor on the releasable film may include filling pores in the non-woven mat.

In one aspect, a plurality of solid-state electrolyte particles may be disposed on the releasable film and disposing a polymeric precursor on the releasable film may include filling voids between the solid-state electrolyte particles.

In one aspect, the method may further include removing the releasable film.

In one aspect, the crosslinkable polymer may be selected from the group consisting of: polypropylene glycol diamine, polyethylene glycol diamine, polypropylene glycol diepoxy, polyethylene glycol diepoxy, and copolymers and combinations thereof.

In one aspect, the plasticizer may be selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), and combinations thereof.

In one aspect, the lithium salt may be selected from the group consisting of: lithium tetrafluoroborate (LiBF$_4$), lithium perchlorate (LiClO$_4$), lithium hexafluorophosphate (LiPF$_6$), lithium hexafluoroarsenate (LiAsF$_6$), lithium trifluoromethanesulfonate (LiTf), lithium bis(fluorosulfonyl)imide (LiFSI), lithium bis(trifluoromethanesulfonyl)imide (LiTFSI), lithium bis(oxalato)borate (LiBOB), and combinations thereof.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 1A is an illustration of an example solid-state battery. FIG. 1B is an example solid-state battery having a polymeric gel electrolyte that includes a plurality of solid-state electrolyte particles in accordance with various aspects of the present disclosure.

FIGS. 4A-4C illustrate an example method for forming a polymeric gel electrolyte, like the polymeric gel electrolyte illustrated in FIG. 3, in accordance with various aspects of the present disclosure. For example, FIG. 4A illustrates an example method for preparing a battery including a non-woven mat; FIG. 4B illustrates an example method for imbibing the non-woven mat with a polymeric precursor; and FIG. 4C illustrates an example solid-state battery having a polymeric gel electrolyte prepared by reacting the imbibed polymeric precursor.

FIGS. 5A-5B illustrate another example method for forming a polymeric gel electrolyte, like the polymeric gel electrolyte illustrated in FIG. 3, in accordance with various aspects of the present disclosure. For example, FIG. 5A illustrates an example method for preparing a free-standing polymeric gel electrolyte layer; and FIG. 5B illustrates an example method for integrating the free-standing polymeric gel electrolyte layer in an example solid-state battery.

FIG. 6A illustrates example methods for forming a polymeric precursor on an exposed surface of an electrode and reacting the polymeric precursor to form a polymeric gel electrolyte; and FIG. 6B illustrates example methods for aligning the electrode and polymeric gel electrolyte and a second electrode and assembling an solid-state battery including the electrode and polymeric gel electrolyte and a second electrode.

Corresponding reference numerals indicate corresponding parts throughout the several views of the drawings.

DETAILED DESCRIPTION

Figure 1A:
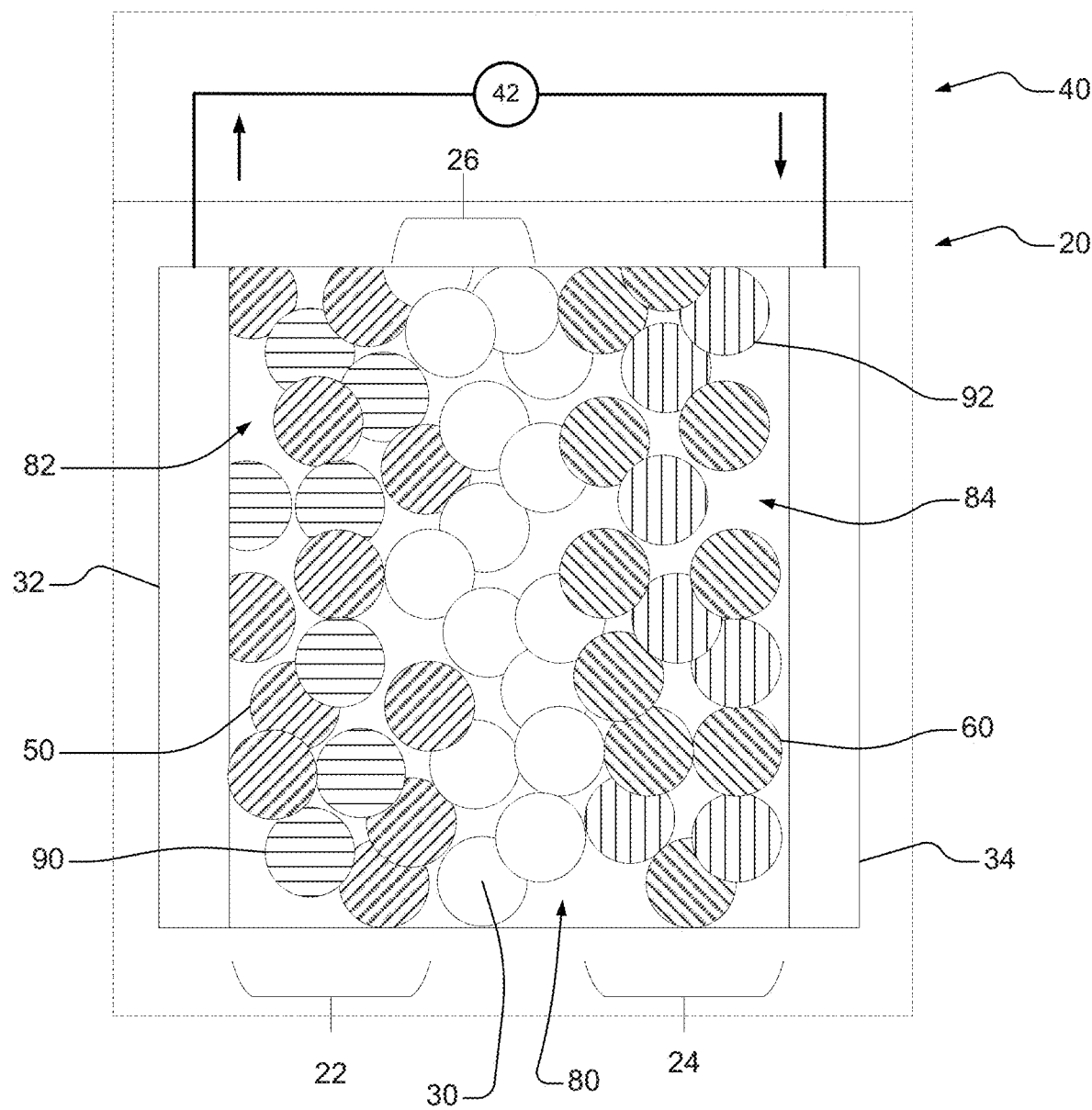
FIGS. 1A-1B.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state batteries (SSBs), for example only, bipolar solid-state batteries, including a polymeric gel electrolyte, and methods for forming solid-state batteries including polymeric gel electrolytes. Solid-state batteries may include at least one solid component, for example, at least one solid electrode, but may also include semi-solid or gel, liquid, or gas components, in certain variations. As described herein, at least one component, namely the electrolyte, may be a semi-solid. Solid-state batteries may have a bipolar stacking design comprising a plurality of bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of a current collector that is parallel with the first side. The first mixture may include, as the solid-state electroactive material particles, cathode material particles. The second mixture may include, as solid-state electroactive material particles, anode material particles. The solid-state electrolyte particles in each instance may be the same or different.

Such solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

Figure 1B:
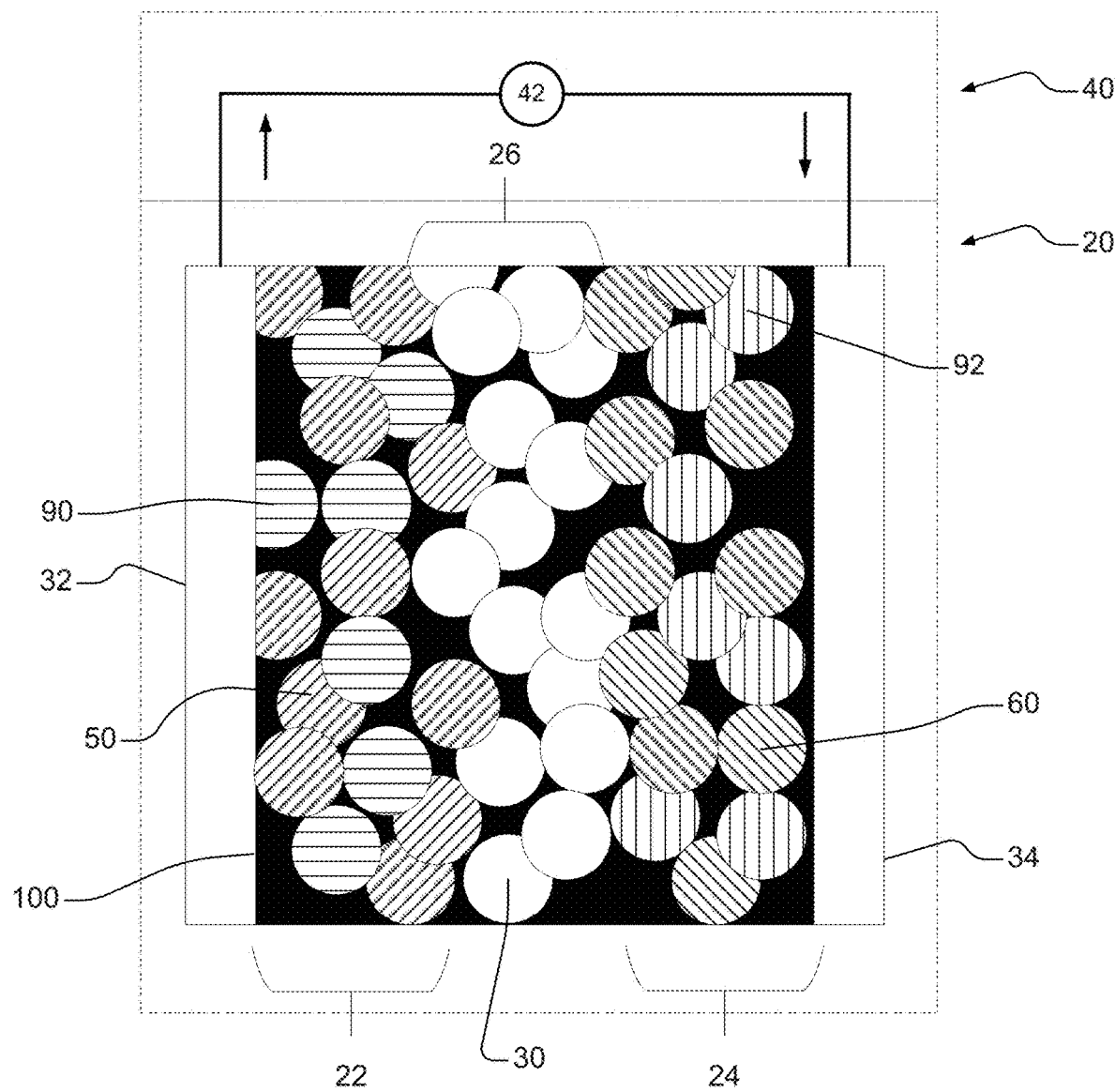

Exemplary and schematic illustrations of a solid-state electrochemical cell (also referred to as a "solid-state battery" and/or "battery") 20 that cycles lithium ions are shown in FIGS. 1A and 1B. The battery 20 includes a negative electrode (i.e., anode) 22, a positive electrode (i.e., cathode) 24, and an electrolyte layer 26 that occupies a space defined between the two or more electrodes. The electrolyte layer 26 is a solid-state or semi-solid state separating layer that physically separates the negative electrode 22 from the positive electrode 24. The electrolyte layer 26 may include a first plurality of solid-state electrolyte particles 30. A second plurality of solid-state electrolyte particles 90 may be mixed with negative solid-state electroactive particles 50 in the negative electrode 22, and a third plurality of solid-state electrolyte particles 92 may be mixed with positive solid-state electroactive particles 60 in the positive electrode 24, so as to form a continuous electrolyte network, which may be a continuous lithium-ion conduction network.

A negative electrode current collector 32 may be positioned at or near the negative electrode 22. A positive electrode current collector 34 may be positioned at or near the positive electrode 24. The negative electrode current collector 32 may be formed from copper or any other appropriate electrically conductive material known to those of skill in the art. The positive electrode current collector 34 may be formed from aluminum or any other electrically conductive material known to those of skill in the art, such as discussed below in the context of FIG. 4B. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34).

The battery 20 can generate an electric current (indicated by arrows in FIGS. 1A and 1B) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the electrolyte layer 26 towards the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Though the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the solid-state electrolyte 26 layer.

In many configurations, each of the negative electrode current collector 32, the negative electrode 22, the electrolyte layer 26, the positive electrode 24, and the positive electrode current collector 34 are prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIGS. 1A and 1, the electrolyte layer 26 provides electrical separation—preventing physical contact—between the negative electrode 22 and the positive electrode 24. The electrolyte layer 26 also provides a minimal resistance path for internal passage of ions. In various aspects, as noted above, the electrolyte layer 26 may be defined by a first plurality of solid-state electrolyte particles 30. For example, the electrolyte layer 26 may be in the form of a layer or a composite that includes the first plurality of solid-state electrolyte particles 30. The solid-state electrolyte particles 30 may have an average particle diameter greater than or equal to about 0.02 µm to less than or equal to about 20 µm, and in certain aspects, optionally greater than or equal to about 0.1 µm to less than or equal to about 1 µm. The electrolyte layer 26 may be in the form of a layer having a thickness greater than or equal to about 5 µm to less than or equal to about 200 µm, optionally greater than or equal to about 10 µm to less than or equal to about 100 µm, optionally about 40 µm, and in certain aspects, optionally about 20 µm.

Such electrolyte layers 26 may have, as illustrated in FIG. 1A, an interparticle porosity 80 (defined herein as a fraction of the total volume of pores over the total volume of the layer or film being described) between the first plurality of solid-state electrolyte particles 30 that is greater than 0 vol. % to less than or equal to about 50 vol. %, greater than or equal to about 1 vol. % to less than or equal to about 40 vol. %, or greater than or equal to about 2 vol. % to less than or equal to about 20 vol. %.

The solid-state electrolyte particles 30 may comprise one or more oxide-based particles, metal-doped or aliovalent-substituted oxide particles, sulfide-based particles, nitride-based particles, hydride-based particles, halide-based particles, and borate-based particles.

In certain variations, the oxide-based particles may comprise one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of:

$Li_{1+x}Al_xGe_{2-x}(PO_4)_3$ (LAGP) (where $0 \leq x \leq 2$), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), and combinations thereof.

In certain variations, the metal-doped or aliovalent-substituted oxide particles may include, for example only, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), and combinations thereof.

In certain variations, the sulfide-based particles may include, for example only, $Li_2S$—$P_2S_5$ system, $Li_2S$—$P_2S_5$-$MO_x$ system (where $1<x<7$), $Li_2S$—$P_2S_5$-$MS_x$ system (where $1<x<7$), $Li_{10}GeP_2S_{12}$, (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$(thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_{5-x}Li_2S$ (where $0.5 \leq x \leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.91}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, LiI—$Li_4SnS_4$, $Li_4SnS_4$, and combinations thereof.

In certain variations, the nitride-based particles may include, for example only, $Li_3N$, $Li_7PN_4$, $LiSi_2N_3$, and combinations thereof, the hydride-based particles may include, for example only, $LiBH_4$, $LiBH_4$—LiX (where x=Cl, Br, or I), $LiNH_2$, $Li_2NH$, $LiBH_4$—$LiNH_2$, $Li_3AlH_6$, and combinations thereof, the halide-based particles may include, for example only, LiI, $Li_3InCl_6$, $Li_2CdC_{14}$, $Li_2MgCl_4$, $LiCdI_4$, $Li_2ZnI_4$, $Li_3OCl$, and combinations thereof; and the borate-based particles may include, for example only, $Li_2B_4O_7$, $Li_2O$—$B_2O_3$—$P_2O_5$, and combinations thereof.

In various aspects, the first plurality of solid-state electrolyte particles 30 may include one or more electrolyte materials selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.75}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), $LiMM'(PO_4)_3$ (where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/16}Nb_{3/4}Zr_{1/4}O_3$, $Li_{3x}La_{(2/3-x)}TiO_3$ (where $0<x<0.25$), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), $Li_2S$—$P_2S_5$ system, $Li_2S$—$P_2S_5$-$MO_x$ system (where $1<x<7$), $Li_2S$—$P_2S_5$-$MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$(thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_{5-x}Li_2S$ (where $0.5 \leq x \leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, LiI—$Li_4SnS_4$, $Li_4SnS_4$, $Li_3N$, $Li_7PN_4$, $LiSi_2N_3$, $LiBH_4$, $LiBH_4$—LiX (where x=Cl, Br, or I), $LiNH_2$, $Li_2NH$, $LiBH_4$—$LiNH_2$, $Li_3AlH_6$, LiI, $Li_3InCl_6$, $Li_2CdC_{14}$, $Li_2MgCl_4$, $LiCdI_4$, $Li_2ZnI_4$, $Li_3OCl$, $Li_2B_4O_7$, $Li_2O$—$B_2O_3$—$P_2O_5$, and combinations thereof.

Although not illustrated, the skilled artisan will recognize that in certain instances, one or more binder particles may be mixed with the solid-state electrolyte particles 30. For example, in certain aspects, the electrolyte layer 26 may include greater than or equal to about 0.5 wt. % to less than or equal to about 10 wt. % of the one or more binders. The one or more binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), and lithium polyacrylate (LiPAA).

The negative electrode 22 may be formed from a lithium host material that is capable of functioning as a negative terminal of a lithium-ion battery. For example, in certain variations, the negative electrode 22 may be defined by a plurality of the negative solid-state electroactive particles 50. In certain instances, as illustrated, the negative electrode 22 is a composite comprising a mixture of the negative solid-state electroactive particles 50 and the second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90. Such negative electrodes 22 may have an interparticle porosity 82 between the negative solid-state electroactive particles 50 and/or the second plurality of solid-state electrolyte particles 90, such as illustrated in FIG. 1A, that is greater than or equal to about 0 vol. % to less than or equal to about 20 vol. %.

The second plurality of solid-state electrolyte particles 90 may be the same as or different from the first plurality of solid-state electrolyte particles 30. In certain variations, the negative solid-state electroactive particles 50 may be lithium-based, for example, a lithium alloy. In other variations, the negative solid-state electroactive particles 50 may be silicon-based comprising, for example, a silicon alloy and/or silicon-graphite mixture. In still other variations, the negative electrode 22 may be a carbonaceous anode and the negative solid-state electroactive particles 50 may comprise one or more negative electroactive materials, such as graphite, graphene, hard carbon, soft carbon, and carbon nanotubes (CNTs). In still further variations, the negative electrode 22 may comprise one or more negative electroactive materials, such as lithium titanium oxide ($Li_4Ti_5On$); one or more metal oxides, such as $TiO_2$ and/or $V_2O_5$; and metal sulfides, such as FeS. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and combinations thereof.

In certain variations, the negative electrode 22 may further include one or more conductive additives and/or binder materials. For example, the negative solid-state electroactive particles 50 (and/or second plurality of solid-state electrolyte particles 90) may be optionally intermingled with one or more electrically conductive materials (not shown) that provide an electron conduction path and/or at least one polymeric binder material (not shown) that improves the structural integrity of the negative electrode 22.

For example, the negative solid-state electroactive particles 50 (and/or second plurality of solid-state electrolyte particles 90) may be optionally intermingled with binders, such as polyvinylidene difluoride (PVDF), polytetrafluoroethylene (PTFE), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The positive electrode 24 may be formed from a lithium-based or electroactive material that can undergo lithium intercalation and deintercalation while functioning as the positive terminal of the battery 20. For example, in certain variations, the positive electrode 24 may be defined by a plurality of the positive solid-state electroactive particles 60. In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92. Such positive electrodes 24 may have an interparticle porosity 84 between the positive solid-state electroactive particles 60 and/or the third plurality of solid-state electrolyte particles 92, such as illustrated in FIG. 1A, that is greater than or equal to about 1 vol. % to less than or equal to about 20 vol. %, and optionally greater than or equal to 5 vol. % to less than or equal to about 10 vol. %.

The third plurality of solid-state electrolyte particles 92 may be the same as or different from the first and/or second pluralities of solid-state electrolyte particles 30, 90. In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_yAl_{1-x-y}O_2$ (where $0 < x \leq 1$ and $0 \leq y \leq 1$), $LiNi_xMn_{1-x}O_2$ (where $0 \leq x \leq 1$), and $Li_{1+x}MO_2$ (where $0 \leq x \leq 1$) for solid-state lithium-ion batteries. The spinel cathode may include one or more positive electroactive materials, such as $LiMn_2O_4$ and $LiNi_{0.5}Mn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In this fashion, in various aspects, the positive solid-state electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive solid-state electroactive particles 60 may be coated (for example, by $LiNbO_3$ and/or $Al_2O_3$) and/or the positive electroactive material may be doped (for example, by aluminum and/or magnesium).

In certain variations, the positive electrode 24 may further include one or more conductive additives and/or binder materials. For example, the positive solid-state electroactive particles 60 (and/or third plurality of solid-state electrolyte particles 92) may be optionally intermingled with one or more electrically conductive materials (not shown) that provide an electron conduction path and/or at least one polymeric binder material (not shown) that improves the structural integrity of the positive electrode 24.

For example, the positive solid-state electroactive particles 60 (and/or third plurality of solid-state electrolyte particles 92) may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

As a result of the interparticle porosity 80, 82, 84 between particles within the battery 20 (for example, the battery 20 in a green form may have a solid-state electrolyte interparticle porosity greater than or equal to about 10 vol. % to less than or equal to about 40 vol. %), direct contact between the solid-state electroactive particles 50, 60 and the pluralities of solid-state electrolyte particles 30, 90, 92 may be much lower than the contact between a liquid electrolyte and solid-state electroactive particles in comparable non-solid-state batteries. In various aspects, such as illustrated in FIG. 1B, the present disclosure provides an electrochemical cell that further includes a polymeric gel electrolyte 100. The polymeric gel electrolyte 100 may be disposed within the battery so as to wet interfaces and/or fill void spaces between the solid-state electrolyte particles 50, 60 and/or the solid-state active material particles 30, 90, 92 so as to, for example only, reduce interparticle porosity 80, 82, 84 and improve ionic contact and/or enable higher thermal stability. The battery 20 may include greater than or equal to about 0 wt. % to less than or equal to about 30 wt. %, and in certain aspects, greater than or equal to about 5 wt. % to less than or equal to about 20 wt. %, of the polymeric gel electrolyte 100. Though it appears that there are no pores or voids remaining in the illustrated figure, some smaller porosity may remain between adjacent particles (including between the solid-state electroactive particles 50 and/or the solid-state electrolyte particles 90 and/or the solid-state electrolyte particles 30, and between the solid-state electroactive particles 60 and/or the solid-state electrolyte particles 92 and/or the solid-state electrolyte particles 30) depending on the penetration of the polymeric gel electrolyte 100

The polymeric gel electrolyte 100 may have an ionic conductivity greater than or equal to about 0.1 mS/Cm to less than or equal to about 3 mS/cm. The solid-state polymeric gel electrolyte 100 includes a crosslinked polymer network. The crosslinked polymer network includes one or more crosslinked polymers. For example, the solid-state polymeric gel electrolyte 100 may include greater than or equal to about 5 wt. % to less than or equal to about 50 wt. % of the one or more crosslinked polymers. The one or more crosslinked polymers may include, for example, poly(ethylene glycol) (PEG)-based polymers and/or poly(propylene glycol) (PPG)-based polymers. For example, the one or more crosslinked polymers may include polypropylene glycol diamine, polyethylene glycol diamine, polypropylene glycol diepoxy, polyethylene glycol diepoxy, and copolymers thereof. In certain instances, the one or more crosslinked polymer may include a first crosslinked polymer and a second crosslinked polymer. For example, a molar ratio of the first crosslinked polymer to the second crosslinked polymer may be about 1:2. The first crosslinked polymer may be polypropylene glycol diamine, polyethylene glycol diamine, and copolymers thereof. The second crosslinked polymer may be polypropylene glycol diepoxy, polyethylene glycol diepoxy, and copolymers thereof.

In certain variations, the solid-state polymeric gel electrolyte 100 may also include a plasticizer and/or lithium salt embedded in the crosslinked polymer network. For example, the solid-state polymeric gel electrolyte 100 may include greater than or equal to about 45 wt. % to less than or equal to about 80 wt. % of the plasticizer and greater than or equal to about 5 wt. % to less than or equal to about 30 wt. % of the lithium salt. The plasticizer may be selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), and combinations thereof. The lithium salt may be selected from the group consisting of: lithium tetrafluoroborate (LiBF$_4$), lithium perchlorate (LiClO$_4$), lithium hexafluorophosphate (LiPF$_6$), lithium hexafluoroarsenate (LiAsF$_6$), lithium trifluoromethanesulfonate (LiTf), lithium bis(fluorosulfonyl)imide (LiFSI), lithium bis(trifluoromethanesulfonyl)imide (LiTFSI), lithium bis(oxalato)borate (LiBOB), and combinations thereof.

Figure 2:
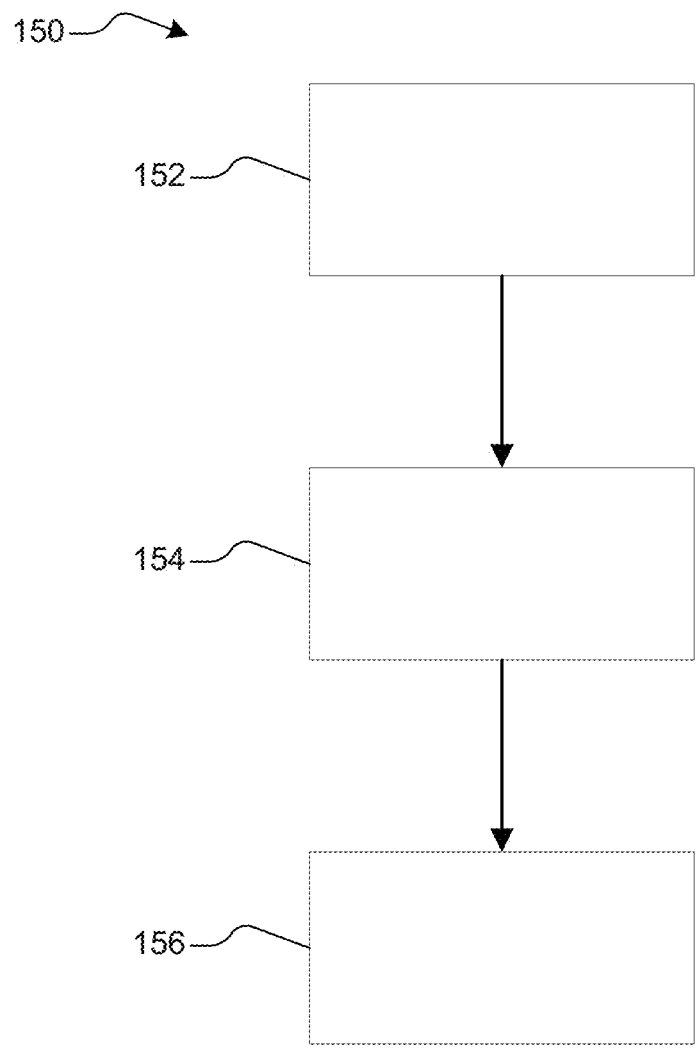
FIG. 2 illustrates a method for forming a polymeric gel electrolyte, like the polymeric gel electrolyte illustrated in FIG. 1B, in accordance with various aspects of the present disclosure.

In various aspects, the present disclosure provides a method for forming a polymeric gel electrolyte, like polymeric gel electrolyte 100 illustrated in FIG. 1B. For example, the polymeric gel electrolyte may be formed by crosslinking a polymeric precursor in situ. More specifically, as illustrated in FIG. 2, the method 150 may include contacting 154 a polymeric precursor and a battery, such as battery 20 illustrated in FIG. 1A, having an interparticle porosity greater than or equal to about 10 vol. % to less than or equal to about 60 vol. %. The contacting 154 may include adding one or more dopes of the polymeric precursor to the battery. In further instances, as discussed below, the battery may include a non-woven mat and contacting 154 may include contacting the polymeric precursor and the non-woven mat. In certain instances, the method 150 may include preparing 152 the polymeric precursor.

The polymeric precursor includes one or more crosslinkable polymers. The polymeric precursor may also include a plasticizer and/or a lithium salt. For example, the polymeric precursor may include greater than or equal to about 5 wt. % to less than or equal to about 50 wt. % of the one or more crosslinkable polymers; greater than or equal to about 45 wt. % to less than or equal to about 80 wt. % of the plasticizer; and greater than or equal to about 5 wt. % to less than or equal to about 30 wt. % of the lithium salt. Preparing 152 the polymeric precursor may include contacting and/or mixing together the one or more crosslinkable polymers and/or the plasticizer and/or the lithium salt.

The one or more crosslinkable polymers may include, for example, poly(ethylene glycol) (PEG)-based polymers and/or poly(propylene glycol) (PPG)-based polymers. For example, the one or more crosslinkable polymers may include polypropylene glycol diamine, polyethylene glycol diamine, polypropylene glycol diepoxy, polyethylene glycol diepoxy, and copolymers thereof. In certain instances, the one or more crosslinkable polymer may include a first crosslinkable polymer and a second crosslinkable polymer. For example, a molar ratio of the first crosslinkable polymer to the second crosslinkable polymer may be about 1:2. The first crosslinkable polymer may be polypropylene glycol diamine, polyethylene glycol diamine, and copolymers thereof. The second crosslinkable polymer may be polypropylene glycol diepoxy, polyethylene glycol diepoxy, and copolymers thereof.

The plasticizer may be selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), and combinations thereof.

The lithium salt may be selected from the group consisting of: lithium tetrafluoroborate (LiBF$_4$), lithium perchlorate (LiClO$_4$), lithium hexafluorophosphate (LiPF$_6$), lithium hexafluoroarsenate (LiAsF$_6$), lithium trifluoromethanesulfonate (LiTf), lithium bis(fluorosulfonyl)imide (LiFSI), lithium bis(trifluoromethanesulfonyl)imide (LiTFSI), lithium bis(oxalato)borate (LiBOB), and combinations thereof.

With renewed reference to FIG. 2, the method 150 may further include reacting 156 the polymeric precursor to form the polymeric gel electrolyte. Reacting 156 the polymeric precursor may include curing the polymeric precursor, for example, by applying heat and/or pressure to the polymeric precursor during cell assembly using an oven or thermal chamber. In certain aspects, the reacting thus promotes crosslinking of the crosslinkable polymeric precursor(s) to form a cross-linked polymeric network. The polymeric precursor may be heated to a temperature greater than or equal to about 80° C. to less than or equal to about 120° C. A pressure applied to the polymeric precursor may be greater than or equal to about 1 PSI to less than or equal to about 15 PSI.

During the reacting 156 process, the one or more crosslinkable polymers may interact to form a crosslinked polymer network. For example, when the first crosslinkable polymer includes polypropylene glycol diamine, polyethylene glycol diamine, and copolymers thereof, and the second crosslinkable polymer includes polypropylene glycol diepoxy, polyethylene glycol diepoxy, and copolymers thereof, each amine can react with two epoxides such that a branched structure is formed.

In various aspects, for example as illustrated in FIG. 1B, the present disclosure provides a solid-state battery consisting essentially of a negative electrode (i.e., anode) including a plurality of negative solid-state electroactive particles, a negative electrode current collector positioned at or near the negative electrode, a positive electrode (i.e., cathode) including a plurality of positive solid-state electroactive particles, a positive electrode current collector positioned at or near the positive electrode, and a polymeric gel electrolyte that fills substantially all voids in the battery and forms a solid-state electrolyte layer in a space between the two or more electrodes so as to form a continuous solid-state electrolyte network. The polymeric gel electrolyte includes a crosslinked polymer network and a plasticizer and/or lithium salt dispersed in the crosslinked polymer network. For example, the polymeric gel electrolyte may include greater than or equal to about 5 wt. % to less than or equal to about 50 wt. % of a crosslinked polymer network, greater than or equal to about 45 wt. % to less than or equal to about 80 wt. % of a plasticizer, and greater than or equal to about 5 wt. % to less than or equal to about 30 wt. % of a lithium salt.

Although the above illustrated example in FIG. 1B includes a negative electrode 22 that includes a second plurality of solid-state electrolyte particles 90, an electrolyte layer 26 that includes a first plurality of solid-state electrolyte particles 30, and a positive electrode 24 that includes a third plurality of solid-state electrolyte particles 92, the skilled artisan will recognize that the above teachings apply to various other configurations, including for example only, batteries including electrolyte layers including only a polymeric gel electrolyte, a negative electrode including a plurality of negative solid-state electroactive particles and a polymeric gel electrolyte, and/or a positive electrode including a plurality of positive solid-state electroactive particles and a polymeric gel electrolyte.

Figure 3:
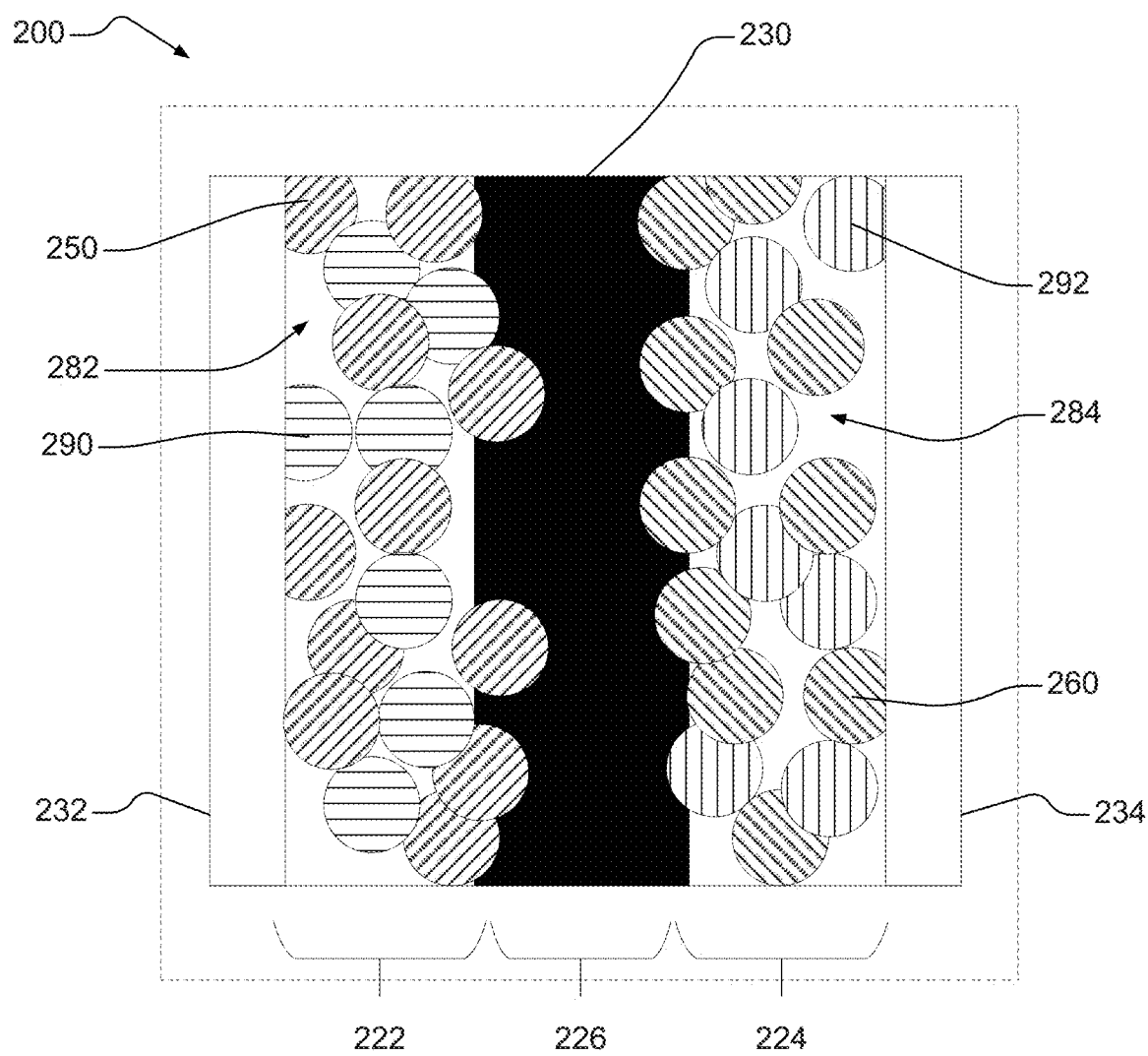
FIG. 3 is another example of a solid-state battery having a polymeric gel electrolyte disposed between a positive electrode and a negative electrode, each of the positive and negative electrodes having solid-state electrolyte particles in accordance with various aspects of the present disclosure.

For example, an exemplary and schematic illustration of another example solid-state electrochemical cell 200 that cycles lithium ions is shown in FIG. 3. Like battery 20, the battery 200 includes a negative electrode (i.e., anode) 222, a negative electrode current collector 232 positioned at or near the negative electrode 222, a positive electrode (i.e., cathode) 224, a positive electrode current collector 234 positioned at or near the positive electrode 224, and a electrolyte layer 226 disposed between the negative electrode 222 and the positive electrode 224. The negative electrode 222 may include a plurality of negative solid-state electroactive particles 250 mixed with a first plurality of solid-state electrolyte particles 290. The positive electrode 224 may include a plurality of positive solid-state electroactive particles 260 mixed with a second plurality of solid-state electrolyte particles 292.

The electrolyte layer 226 may be a separating layer that physically separates the negative electrode 222 from the positive electrode 224. The electrolyte layer 226 may be defined by a polymeric gel electrolyte 230. The polymeric gel electrolyte 230 may be in the form of a layer 226 having a thickness greater than or equal to about 5 μm to less than or equal to about 200 μm, optionally greater than or equal to about 10 μm to less than or equal to about 100 μm, optionally about 40 μm, and in certain aspects, optionally about 20 μm. Though not shown in FIG. 3, in certain variations, the polymeric gel electrolyte 230 may include a non-woven mat, as detailed below.

Figure 4B:
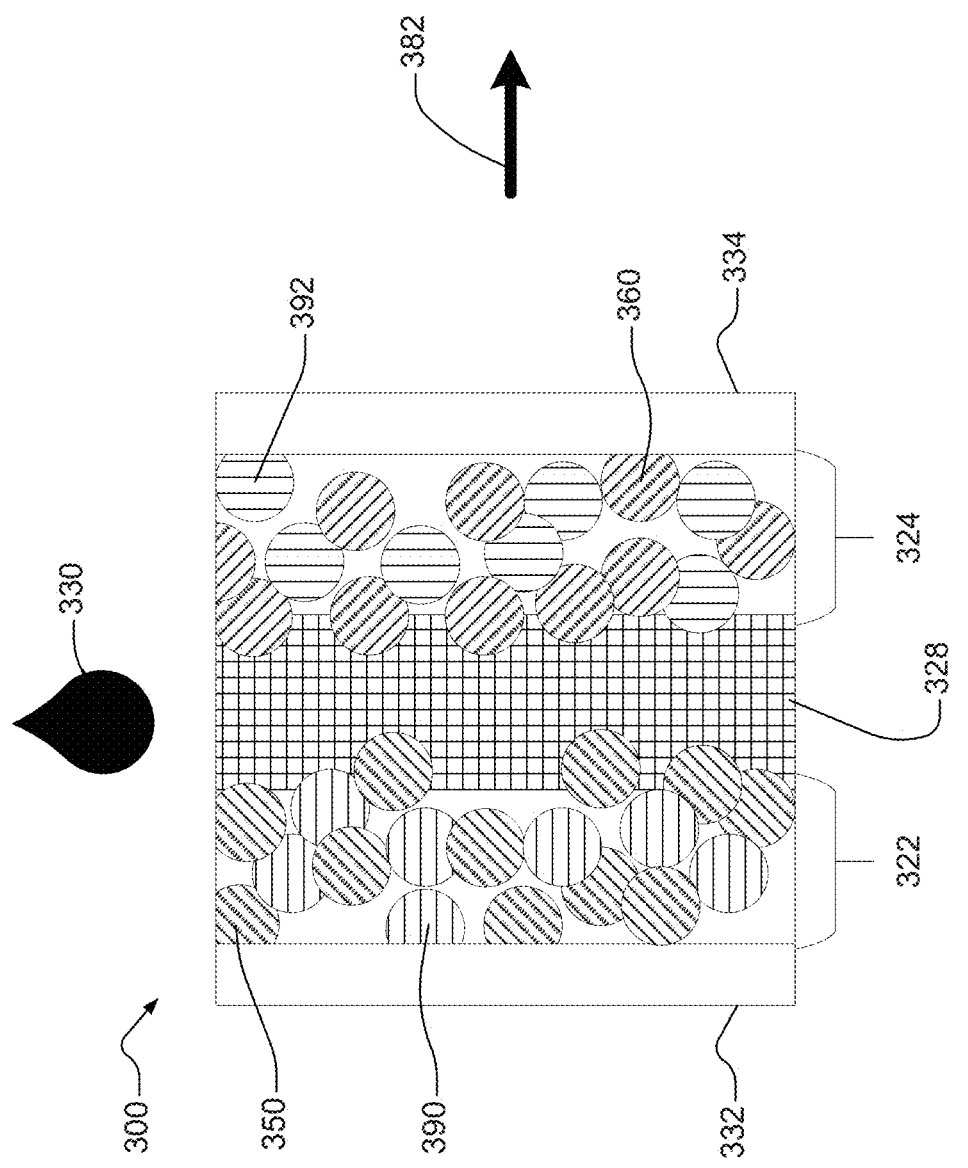
Figure 4C:
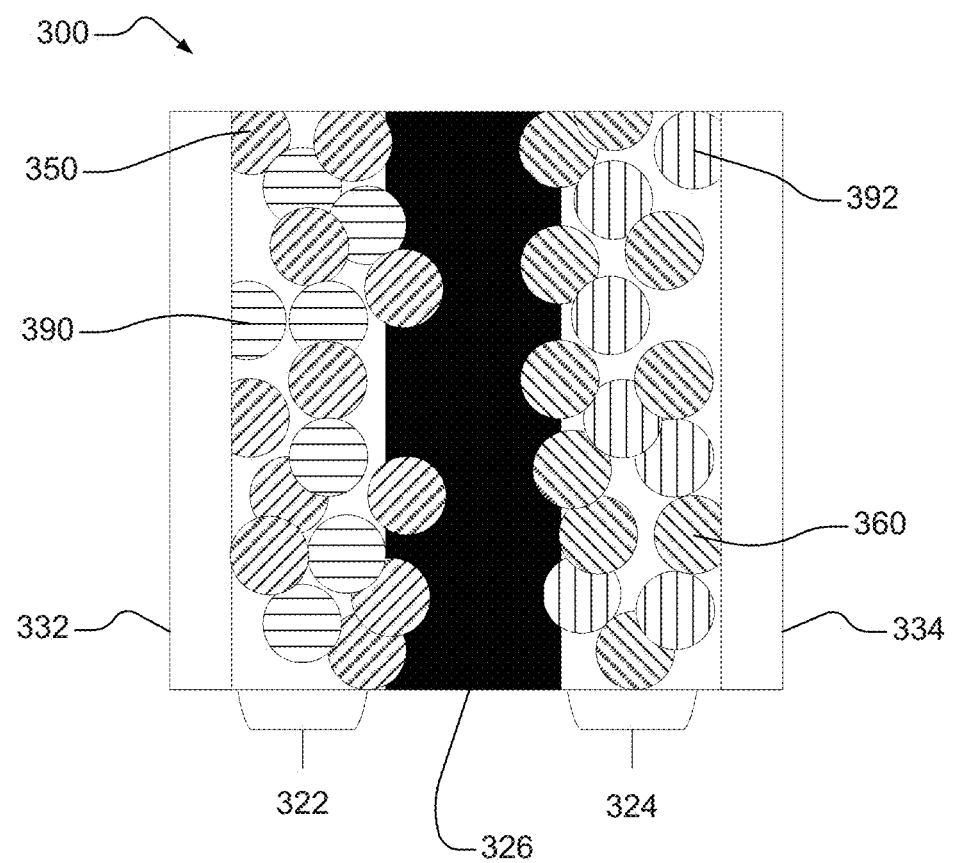
Figure 5A:
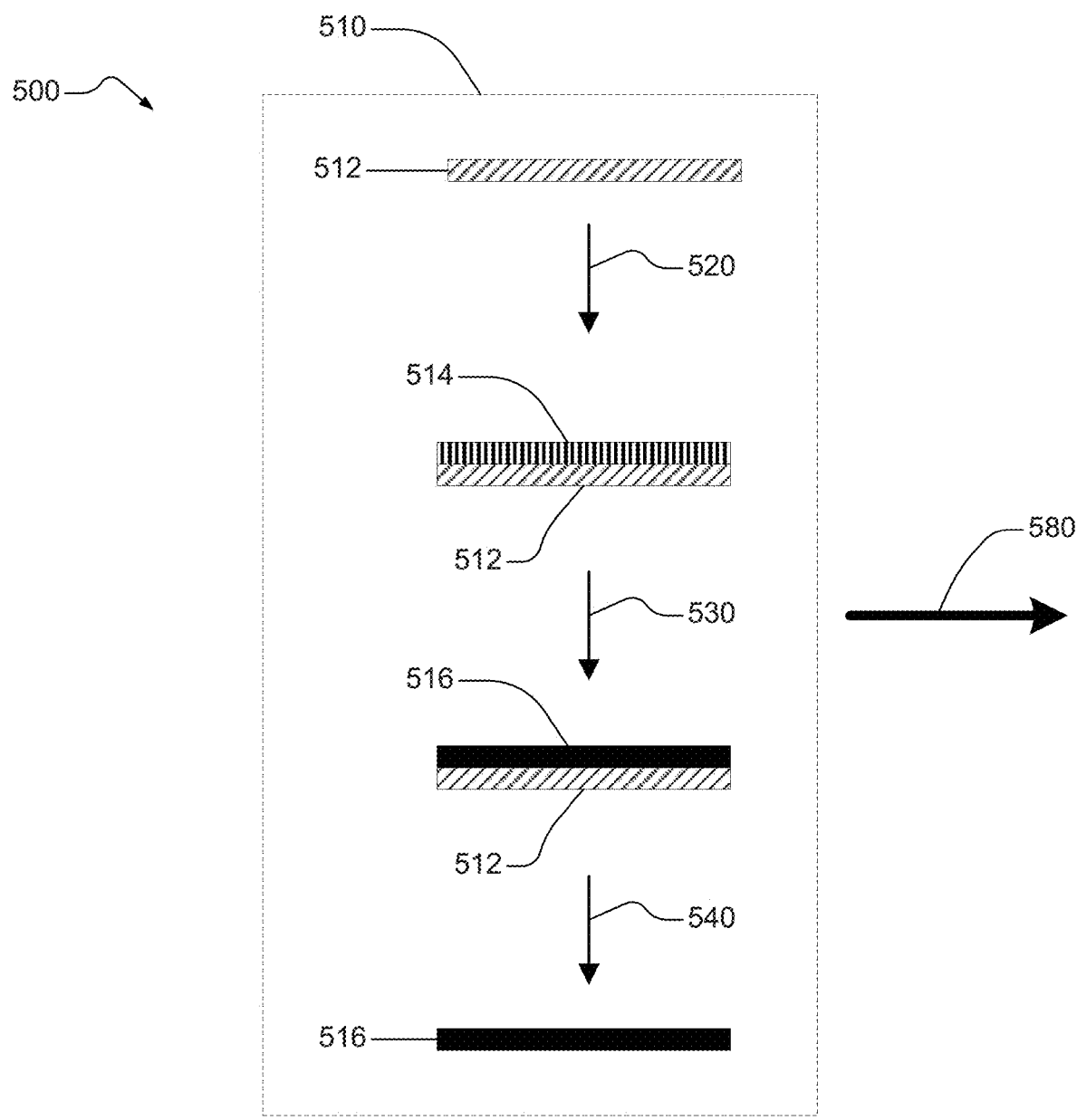
Figure 6A:
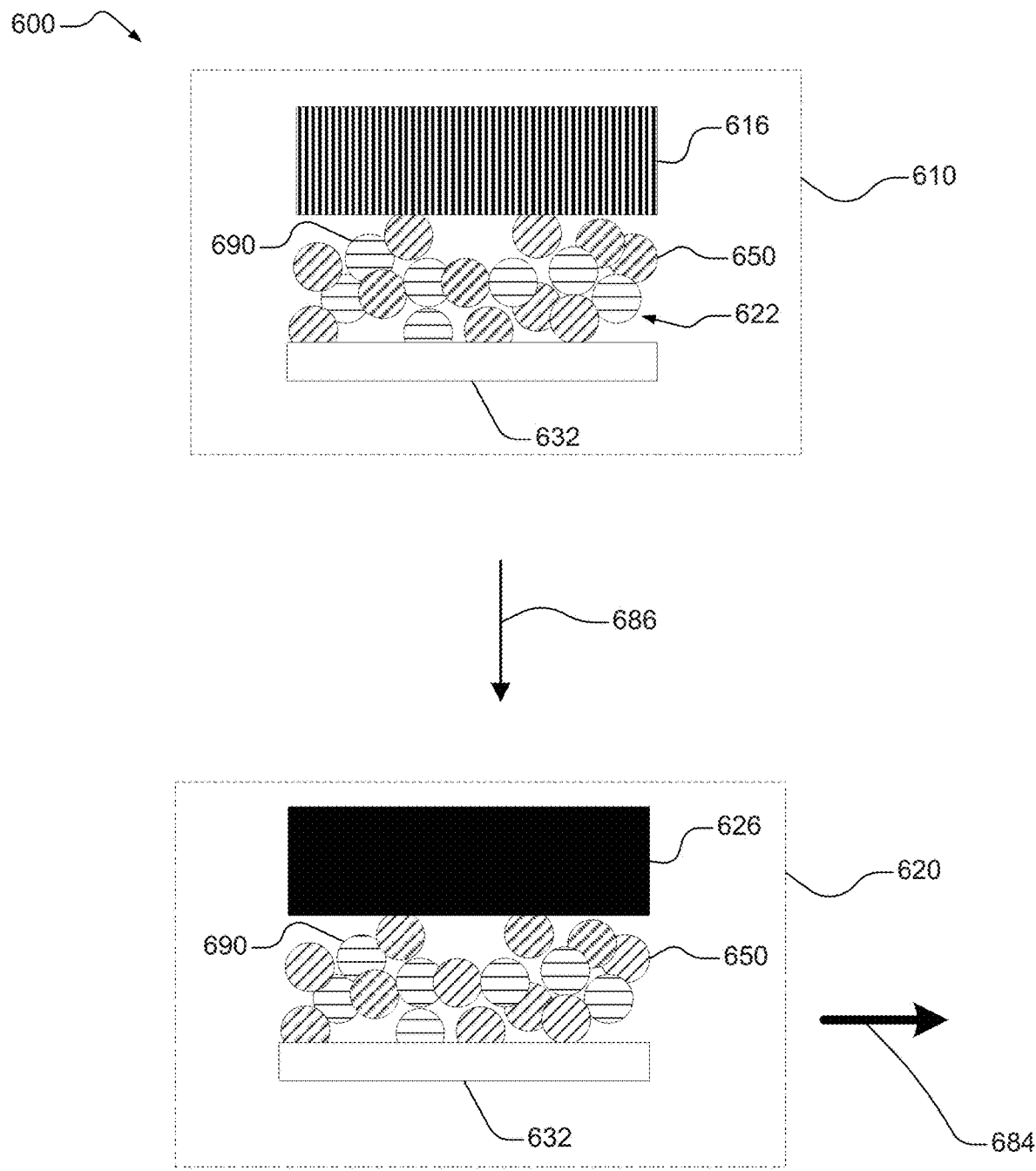
FIGS. 6A-6B illustrate another example method for forming a polymeric gel electrolyte, like the polymeric gel electrolyte illustrated in FIG. 3, in accordance with various aspects of the present disclosure. For example.
Figure 6B:
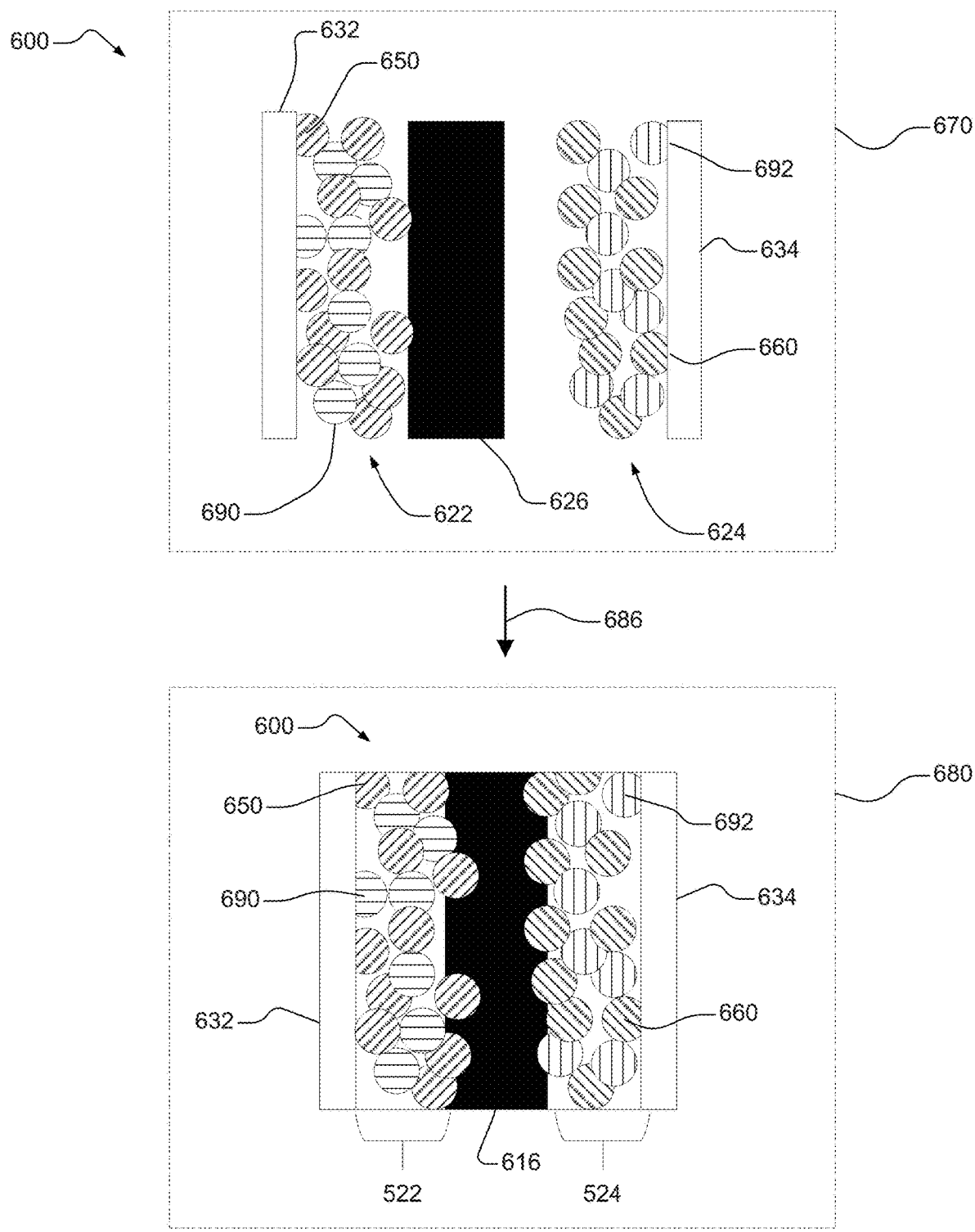

In various aspects, the present disclosure provides methods for forming a polymeric gel electrolyte, like polymeric gel electrolyte 230 illustrated in FIG. 3. In certain aspects, such as illustrated in FIGS. 4A-4C, a polymeric gel electrolyte may be formed by crosslinking a polymeric precursor in situ. In other aspects, such as illustrated in FIGS. 5A and 5B, a polymeric gel electrolyte may be formed as a free-standing electrolyte layer and subsequently introduced into a cell. In still other aspects, such as illustrated in FIGS. 6A and 6B, a solid-state polymeric gel electrolyte may be formed on a surface of an electrode prior to assembly of the cell.

As illustrated in FIGS. 4A-4C, one method 300 includes contacting 304 a polymeric precursor 330 and a battery 300 including a non-woven mat 328 disposed between a negative electrode (i.e., anode) 322 and a positive electrode (i.e., cathode) 324.

In certain instances, the method 300 may include preparing 370 the battery 300. As illustrated in FIG. 4A, preparing the battery 300 may including disposing the non-woven mat 328 between the negative electrode 322 and the positive electrode 324. The non-woven mat 328 may have a thickness greater than or equal to about 10 μm to less than or equal to about 50 μm, and in certain aspects, optionally greater than or equal to about 10 μm to less than or equal to about 20 μm. The non-woven mat 328 may have a basis weight greater than or equal to about 5 g/m$^2$ to less than or equal to about 15 g/m$^2$. The negative electrode 322 may include a plurality of negative solid-state electroactive particles 350 mixed with a first plurality of solid-state electrolyte particles 390. The positive electrode 324 may include a plurality of positive solid-state electroactive particles 360 mixed with a second plurality of solid-state electrolyte particles 392. A negative electrode current collector 332 may be positioned at or near the negative electrode 322. A positive electrode current collector 334 may be positioned at or near the positive electrode 324.

As illustrated by arrow 380, in various aspects, the method 300 may further includes adding a polymeric precursor 330. For example, as illustrated in FIG. 4B, the non-woven mat 328 may imbibe the polymeric precursor 330. The polymeric precursor 330 may include one or more crosslinkable polymers. The polymeric precursor may also include a plasticizer and/or a lithium salt. For example, the polymeric precursor may include greater than or equal to about 5 wt. % to less than or equal to about 50 wt. % of the one or more crosslinkable polymers; greater than or equal to about 45 wt. % to less than or equal to about 80 wt. % of the plasticizer; and greater than or equal to about 5 wt. % to less than or equal to about 30 wt. % of the lithium salt. The one or more crosslinkable polymers may include a first crosslinkable polymer and a second crosslinkable polymer. For example, a molar ratio of the first crosslinkable polymer to the second crosslinkable polymer may be about 1:2. Preparing the polymeric precursor may include contacting and/or mixing together the one or more crosslinkable polymers and/or the plasticizer and/or the lithium salt.

As illustrated by arrow 382, in various aspects, the method 300 may further reacting the polymeric precursor 330 to form the polymeric gel electrolyte 326 in and around the non-woven mat 328. The polymer precursor 330 may be reacted upon the application of heat and/or pressure, such as applied during cell assembly.

FIGS. 5A and 5B illustrate another method 500 for forming a polymeric gel electrolyte, like polymeric gel electrolyte 230 illustrated in FIG. 3. The method 500 includes preparing 510 a free-standing polymeric gel electrolyte and disposing 570 the free-standing polymeric gel electrolyte between a negative electrode (i.e., anode) 522 and a positive electrode (i.e., cathode) 524 during cell assembly.

As illustrated in FIG. 5A, preparing 510 the free-standing polymeric gel electrolyte 516 may include obtaining or preparing a substrate 512 and disposing 520 a polymeric precursor 514 on at least one surface of the substrate 512. The substrate 512 may be a releasable film comprising glass, aluminum foil, polyethylene terephthalate (PET), polytetrafluoroethylene (PTFE), or the like. The polymeric precursor 514 may be disposed on the substrate 512 using a coating process, such as blade coating and/or a roll-to-roll coating process.

The polymeric precursor 514 includes one or more crosslinkable polymers. The polymeric precursor may also include a plasticizer and/or a lithium salt. For example, the polymeric precursor may include greater than or equal to about 5 wt. % to less than or equal to about 50 wt. % of the one or more crosslinkable polymers; greater than or equal to about 45 wt. % to less than or equal to about 80 wt. % of the plasticizer; and greater than or equal to about 5 wt. % to less than or equal to about 30 wt. % of the lithium salt. The one or more crosslinkable polymers may include a first crosslinkable polymer and a second crosslinkable polymer. For example, a molar ratio of the first crosslinkable polymer to the second crosslinkable polymer may be about 1:2. Preparing the polymeric precursor may include contacting and/or mixing together the one or more crosslinkable polymers and/or the plasticizer and/or the lithium salt.

In certain variations, preparing 510 may further include reacting 530 the polymeric precursor 514 so to form the free-standing polymeric gel electrolyte 516. Reacting 530 the polymeric precursor 514 may include curing the polymeric precursor, for example, by heating the polymeric precursor 514. For example, the polymeric precursor 514 may be heated to a temperature greater than or equal to about 80° C. to less than or equal to about 120° C. The free-standing polymeric gel electrolyte 516 may be removed 540 from the substrate 512, and as illustrated by arrow 580 and FIG. 5B, the free-standing polymeric gel electrolyte 516 may be disposed 570 between a negative electrode 522 and a positive electrode 524. Disposing 570 the free-standing polymeric gel electrolyte 516 between the negative electrode 522 and the positive electrode 524 may include stacking the free-standing polymeric gel electrolyte 516, for example, using common stacking processes. The negative electrode 522 may include a plurality of negative solid-state electroactive particles 550 mixed with a first plurality of solid-state electrolyte particles 590. The positive electrode 524 may include a plurality of positive solid-state electroactive particles 560 mixed with a second plurality of solid-state electrolyte particles 592. A negative electrode current collector 332 may be positioned at or near the negative electrode 522. A positive electrode current collector 534 may be positioned at or near the positive electrode 524.

FIG. 6 illustrates yet another method 600 for forming a polymeric gel electrolyte, like polymeric gel electrolyte 230 illustrated in FIG. 3. The method 600 may include forming a polymeric gel electrolyte 626 on a surface of an electrode, for example only, the negative electrode 622, prior to assembly of the cell 600. More specifically, as illustrated in FIG. 6A, the method 600 may include disposing 610 a polymeric precursor 616 on an exposed surfaces of the negative electrode 622. In certain variations, as illustrated, the polymeric precursor 616 may be disposed in the form of a continuous layer using known coating methods. In certain variations, though not illustrated, disposing 610 the polymeric precursor 616 on exposed surfaces of the negative electrode 622 may include introducing a portion of the polymeric precursor 616 into the voids or pores in the negative electrode 622.

As illustrated by arrow 682, the method 600 may further include reacting 620 the polymeric precursor 616 to form the polymeric gel electrolyte 626. Reacting 620 the polymeric precursor 616 may include curing the polymeric precursor 616, for example, by heating the polymeric precursor 616. For example, the polymeric precursor 514 may be heated to a temperature greater than or equal to about 80° C. to less than or equal to about 120° C. Though the polymeric gel electrolyte 626 is illustrated as being formed on the negative electrode 622, the skilled artisan will appreciate that the in various other instances, the polymeric gel electrolyte 626 may be instead formed on a surface of the positive electrode 626.

The polymeric precursor 616 may include one or more crosslinkable polymers. The polymeric precursor may also include a plasticizer and/or a lithium salt. For example, the polymeric precursor may include greater than or equal to about 5 wt. % to less than or equal to about 50 wt. % of the one or more crosslinkable polymers; greater than or equal to about 45 wt. % to less than or equal to about 80 wt. % of the plasticizer; and greater than or equal to about 5 wt. % to less than or equal to about 30 wt. % of the lithium salt. The one or more crosslinkable polymers may include a first crosslinkable polymer and a second crosslinkable polymer. For example, a molar ratio of the first crosslinkable polymer to the second crosslinkable polymer may be about 1:2. Preparing the polymeric precursor may include contacting and/or mixing together the one or more crosslinkable polymers and/or the plasticizer and/or the lithium salt.

As illustrated by arrows 684, 686 and FIG. 6B, the method 600 may further include aligning 670 the coated negative electrode 622 and a positive electrode 624 and assembling 680 the cell 600. The negative electrode 622 may include a plurality of negative solid-state electroactive particles 650 mixed with a first plurality of solid-state electrolyte particles 690. The positive electrode 624 may include a plurality of positive solid-state electroactive particles 660 mixed with a second plurality of solid-state electrolyte particles 692. A negative electrode current collector 632 may be positioned at or near the negative electrode 622. A positive electrode current collector 634 may be positioned at or near the positive electrode 624.

Figure 7:
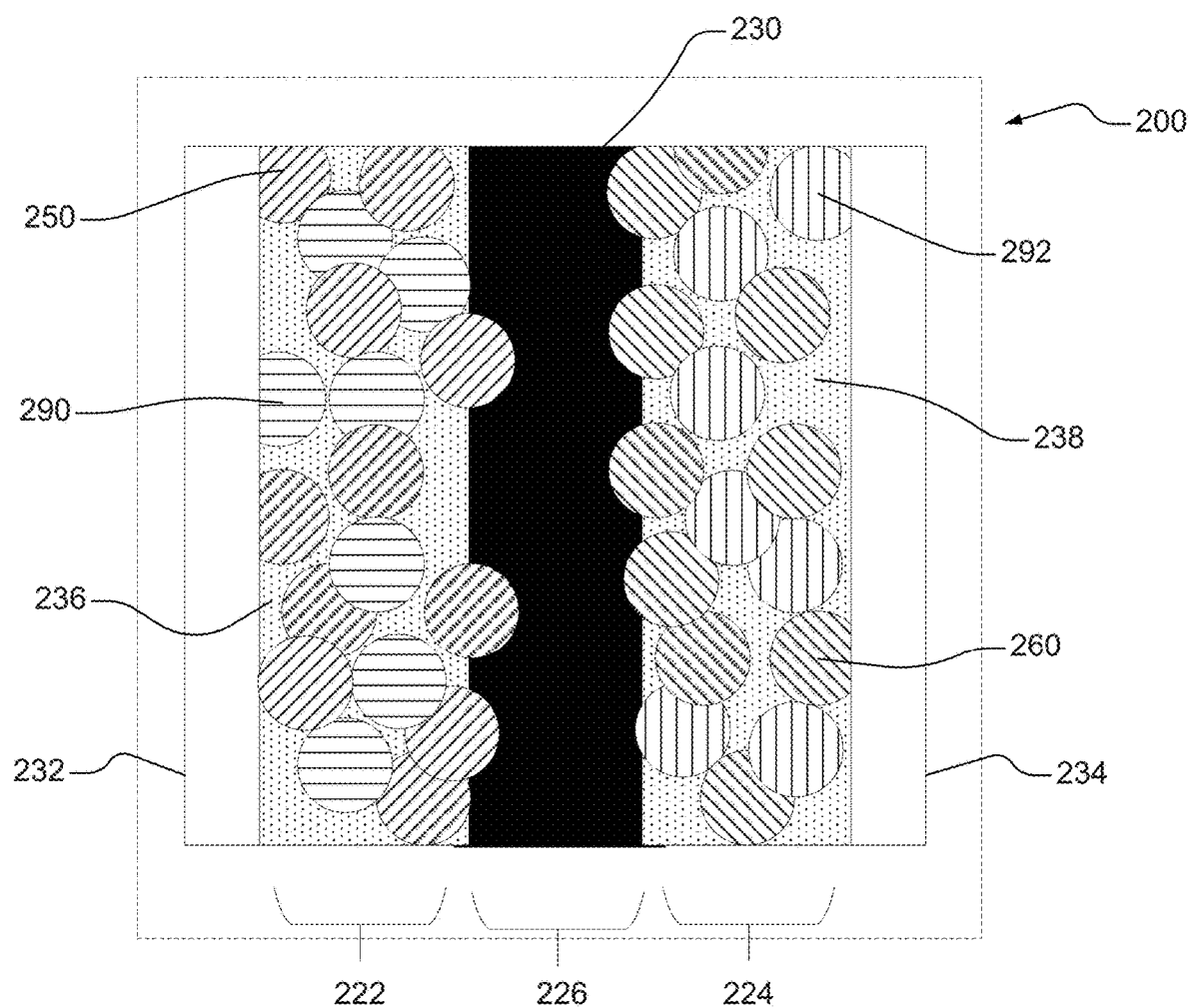
FIG. 7 is another example of a solid-state battery having a first polymeric gel electrolyte disposed between positive and negative electrodes, the negative electrode including a second polymeric gel electrolyte and a first plurality of solid-state electrolyte particles, and the positive electrode including a third polymeric gel electrolyte and a second plurality of solid-state electrolyte particles, in accordance with various aspects of the present technology.

As illustrated in FIG. 3, in certain instances, the negative electrode 222 may have an interparticle porosity 282 between the negative solid-state electroactive particles 250 and/or the first plurality of solid-state electrolyte particles 290 that is greater than or equal to about 0 vol. % to less than or equal to about 20 vol. %; and/or the positive electrode 224 may have an interparticle porosity 284 between the positive solid-state electroactive particles 260 and/or the second plurality of solid-state electrolyte particles 292 that is greater than or equal to about 1 vol. % to less than or equal to about 20 vol. %, and optionally greater than or equal to 5 vol. % to less than or equal to about 10 vol. %. In some configurations, such as illustrated in FIG. 7, a second polymeric gel electrolyte 236 may be disposed within the battery so as to wet interfaces and/or fill void spaces between the negative solid-state electrolyte particles 250 and/or the solid-state active material particles 290 and/or a third polymeric gel electrolyte 238 may be disposed within the battery so as to wet interfaces and/or fill void spaces between the positive solid-state electrolyte particles 260 and/or the solid-state active material particles 292 so as to, for example only, reduce interparticle porosity 282, 284 and further improve ionic contact and/or enable higher thermal stability. The second polymeric gel electrolyte 236 may be the same as or different from the first polymeric gel electrolyte 230 and/or the third polymeric gel electrolyte 238. The third polymeric gel electrolyte 238 may be the same as or different from the first polymeric gel electrolyte 230 and/or the second polymeric gel electrolyte 236. The first polymeric gel electrolyte 230 may be prepared using any of the methods detailed in FIGS. 4A-6B. The second polymeric gel electrolyte 236 and/or third polymeric gel electrolyte 238 may be prepared, for example, using the method 150 illustrated in FIG. 2.

Figure 8:
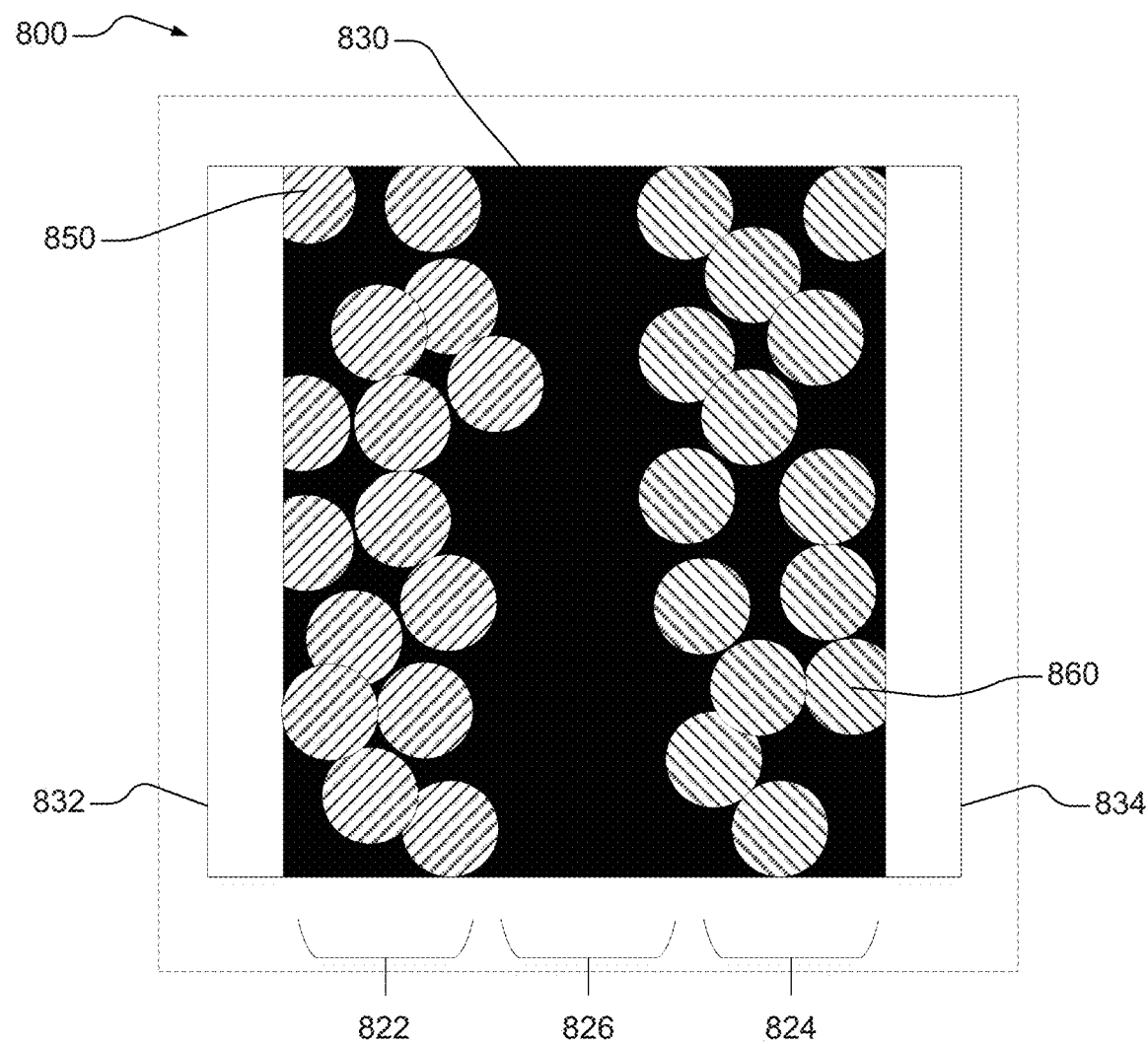
FIG. 8 is another example of a solid-state battery having a polymeric gel electrolyte, the polymeric gel electrolyte forming a solid-state electrolyte disposed between positive and negative electrodes and filling voids between solid-state electroactive material particles, in accordance with various aspects of the present technology.
Figure 9:
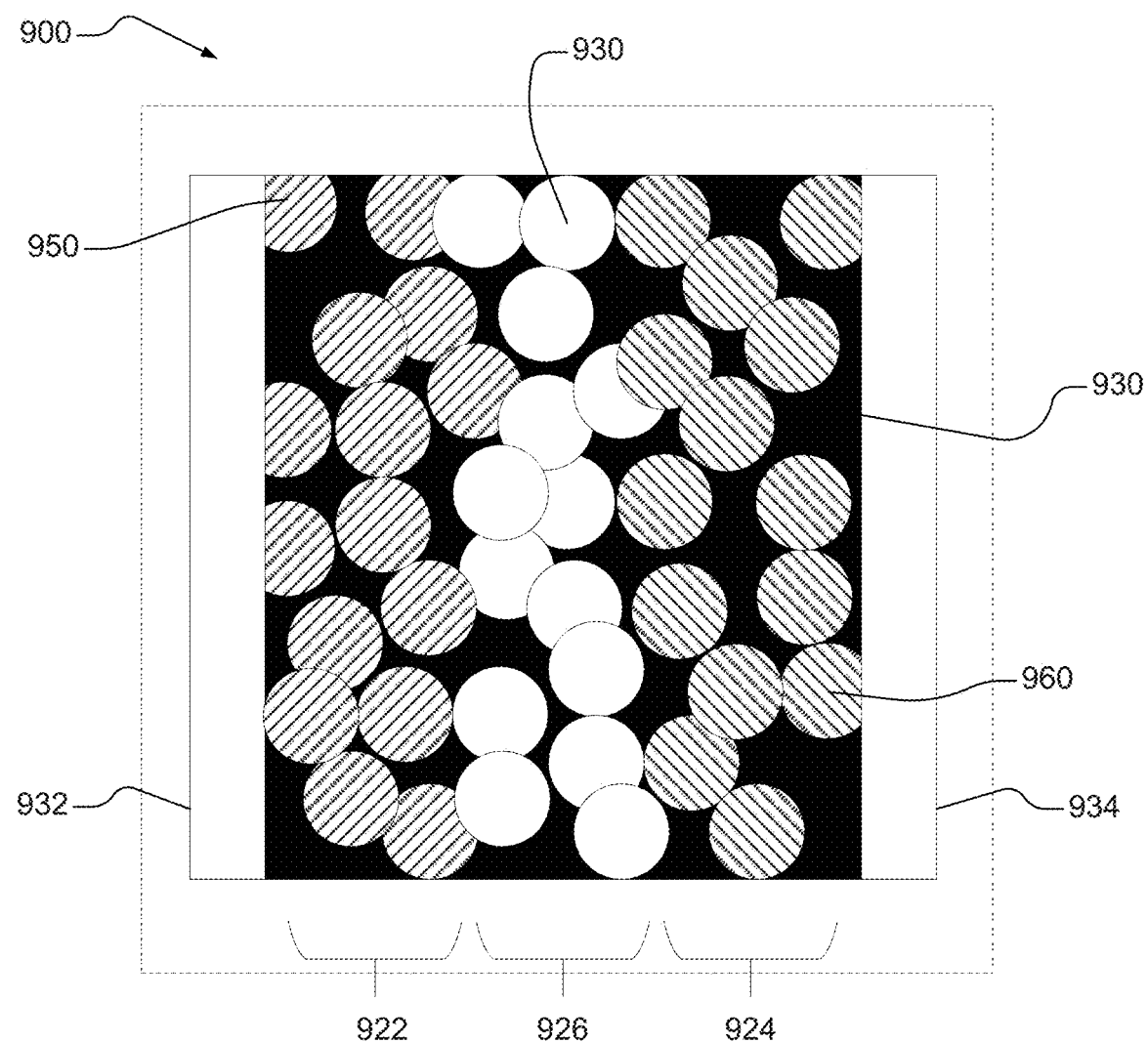
FIG. 9 is another example of a solid-state battery having a polymeric gel electrolyte, the polymeric gel electrolyte including a plurality of solid-state electrolyte particles and filling voids between solid-state electroactive material particles, in accordance with various aspects of the present technology.

An exemplary and schematic illustration of another example solid-state electrochemical cell 800 that cycles lithium ions is shown in FIG. 8. Like battery 20, the battery 800 includes a negative electrode (i.e., anode) 822, a negative electrode current collector 832 positioned at or near the negative electrode 822, a positive electrode (i.e., cathode) 824, a positive electrode current collector 834 positioned at or near the positive electrode 824, and a polymeric gel electrolyte 830. The negative electrode 822 may include a plurality of negative solid-state electroactive particles 850. The positive electrode 824 may include a plurality of positive solid-state electroactive particles 860. As illustrated, the polymeric gel electrolyte 830 may fill substantially all voids between the negative solid-state electroactive material particles 850 and/or the positive solid-state electroactive material particles 860. The polymeric gel electrolyte 830 may also form a solid-state electrolyte 826 between the negative electrode 822 and the positive electrode 824. The solid-state electrolyte 826 may be a separating layer that physically separates the negative electrode 822 from the positive electrode 824. The solid-state electrolyte 826 may have a thickness greater than or equal to about 5 µm to less than or equal to about 200 µm, optionally greater than or equal to about 10 µm to less than or equal to about 100 µm, optionally about 40 µm, and in certain aspects, optionally about 20 µm. Though not shown in FIG. 8, in certain variations, the polymeric gel electrolyte 830 may include a non-woven mat, as detailed below. In various instances, the electrolyte layer 826 may be formed using any of the methods detailed in FIGS. 2 and 4A-6B.

In various aspects, for example as illustrated in FIG. 8, the present disclosure provides a solid-state battery consisting essentially of a negative electrode (i.e., anode), a negative electrode current collector positioned at or near the negative electrode, a positive electrode (i.e., cathode), a positive electrode current collector positioned at or near the positive electrode, and a polymeric gel electrolyte that fills substantially all voids in the battery and forms a solid-state electrolyte layer in a space between the two or more electrodes so as to form a continuous solid-state electrolyte network. The polymeric gel electrolyte includes a crosslinked polymer network and a plasticizer and/or lithium salt dispersed in the crosslinked polymer network. For example, the polymeric gel electrolyte may include greater than or equal to about 5 wt. % to less than or equal to about 50 wt. % of a crosslinked polymer network, greater than or equal to about 45 wt. % to less than or equal to about 80 wt. % of a plasticizer, and greater than or equal to about 5 wt. % to less than or equal to about 30 wt. % of a lithium salt.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a solid-state battery having a continuous solid-state electrolyte network, the method comprising:

contacting a polymeric precursor comprising a crosslinkable polymer and greater than or equal to about 45 wt. % to less than or equal to about 80 wt. % of a plasticizer and an assembled battery comprising two or more electrodes defining a space therebetween, wherein the two or more electrodes comprise a first electrode comprising a first plurality of solid-state electroactive material particles and a first plurality of solid-state electrolyte particles and a second electrode comprising a second plurality of solid-state electroactive material particles and a second plurality of solid-state electrolyte particles, wherein the polymeric precursor fills the space between the two or more electrodes and any voids between the first electrode and the second electrode, any voids between the first plurality of solid-state electroactive material particles and the first plurality of solid-state electrolyte particles and any voids between the second plurality of solid-state electroactive material particles and the second plurality of solid-state electrolyte particles; and reacting the polymeric precursor to form a polymeric gel electrolyte that forms a solid-state electrolyte layer in the space between the two or more electrodes and also fills the voids between the first plurality of solid-state electroactive material particles and the first plurality of solid-state electrolyte particles and between the second plurality of solid-state electroactive material particles and the second plurality of solid-state electrolyte particles so as to form the continuous solid-state electrolyte network.

2. The method of claim 1, wherein the polymeric precursor comprises greater than or equal to about 5 wt. % to less than or equal to about 50 wt. % of the crosslinkable polymer, and the crosslinkable polymer is selected from the group consisting of: polypropylene glycol diamine, polyethylene glycol diamine, polypropylene glycol diepoxy, polyethylene glycol diepoxy, and combinations thereof.

3. The method of claim 1, wherein the crosslinkable polymer comprises a first polymer and a second polymer and a molar ratio of the first polymer to the second polymer is 1:2.

4. The method of claim 3, wherein the first polymer is selected from the group consisting of: polypropylene glycol diamine, polyethylene glycol diamine, copolymers and combinations thereof, and
the second polymer is selected from the group consisting of: polypropylene glycol diepoxy, polyethylene glycol diepoxy, copolymers and combinations thereof.

5. The method of claim 1, wherein
the plasticizer is selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), and combinations thereof.

6. The method of claim 1, wherein the polymeric precursor further comprises greater than or equal to about 5 wt. % to less than or equal to about 30 wt. % of a lithium salt, and
the lithium salt is selected from the group consisting of: lithium tetrafluoroborate ($LiBF_4$), lithium perchlorate ($LiClO_4$), lithium hexafluorophosphate ($LiPF_6$), lithium hexafluoroarsenate ($LiAsF_6$), lithium trifluoromethanesulfonate (LiTf), lithium bis(fluorosulfonyl) imide (LiFSI), lithium bis(trifluoromethanesulfonyl) imide (LiTFSI), lithium bis(oxalato)borate (LiBOB), and combinations thereof.

7. The method of claim 1, wherein a plurality of solid-state electrolyte particles are disposed in the space between the two or more electrodes and the polymeric precursor also fills any void between the plurality of solid-state electrolyte particles to form the solid-state electrolyte layer.

8. The method of claim 1, wherein a non-woven mat is disposed in the space between the two or more electrodes and the polymeric precursor fills pores in the non-woven mat so as to form the solid-state electrolyte layer, and
the non-woven mat has a thickness greater than or equal to about 10 μm to less than or equal to about 50 μm and a basis weight greater than or equal to about 5 g/m$^2$ to less than or equal to about 15 g/m$^2$.

9. A method for forming a solid-state electrolyte, the method comprising:
disposing a polymeric precursor on an exposed surfaces of an electrode, wherein the polymeric precursor comprising greater than or equal to about 5 wt. % to less than or equal to about 50 wt. % of a crosslinkable polymer, greater than or equal to about 45 wt. % to less than or equal to about 80 wt. % of a plasticizer, and greater than or equal to about 5 wt. % to less than or equal to about 30 wt. % of a lithium salt, a plurality of solid-state electrolyte particles is disposed on a surface of the electrode, the electrode comprises a plurality of solid-state electroactive material particles and the polymeric precursor also fills any voids between the plurality of solid-state electrolyte particles and the plurality of solid-state electroactive material particles; and
reacting the polymeric precursor to form a polymeric gel electrolyte that comprises the solid-state electrolyte comprising the plurality of solid-state electrolyte particles on the exposed surface of the electrode and also fills the voids between the plurality of solid-state electroactive material particles to form a continuous solid-state electrolyte network.

10. The method of claim 9, wherein the crosslinkable polymer is selected from the group consisting of: polypropylene glycol diamine, polyethylene glycol diamine, polypropylene glycol diepoxy, polyethylene glycol diepoxy, copolymers and combinations thereof,
the plasticizer is selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), combinations thereof, and
the lithium salt is selected from the group consisting of: lithium tetrafluoroborate ($LiBF_4$), lithium perchlorate ($LiClO_4$), lithium hexafluorophosphate ($LiPF_6$), lithium hexafluoroarsenate ($LiAsF_6$), lithium trifluoromethanesulfonate (LiTf), lithium bis(fluorosulfonyl) imide (LiFSI), lithium bis(trifluoromethanesulfonyl) imide (LiTFSI), lithium bis(oxalato)borate (LiBOB) and combinations thereof.

11. A method for forming a free-standing, solid-state electrolyte layer, the method comprising:
disposing a polymeric precursor on a releasable film, wherein the polymeric precursor comprising greater than or equal to about 5 wt. % to less than or equal to about 50 wt. % of a crosslinkable polymer, greater than or equal to about 45 wt. % to less than or equal to about 80 wt. % of a plasticizer, and greater than or equal to about 5 wt. % to less than or equal to about 30 wt. % of a lithium salt, and wherein a plurality of solid-state electrolyte particles is disposed on one or more surfaces of the releasable film and disposing the polymeric precursor on the releasable film comprises filling any voids between solid-state electrolyte particles of the plurality of solid-state electrolyte particles; and
reacting the polymeric precursor to form the free-standing, solid-state electrolyte layer.

12. The method of claim 11, further comprising:
removing the releasable film.

13. The method of claim 11, wherein the crosslinkable polymer is selected from the group consisting of: polypropylene glycol diamine, polyethylene glycol diamine, polypropylene glycol diepoxy, polyethylene glycol diepoxy, and copolymers and combinations thereof,
the plasticizer is selected from the group consisting of: ethylene carbonate (EC), diethylene carbonate (DEC), dimethylene carbonate (DMC), ethylmethylene carbonate (EMC), dioxolane (DOL), gamma-butyrolactone (GBL), propylene carbonate (PC), diethylene glycol dimethyl ether (diglyme), triethylene glycol dimethyl ether (triglyme), tetraethylene glycol dimethyl ether (tetraglyme), triethyl phosphate (TEP), 1-butyl-3-methylimidazolium bis(trifluoromethylsulfonyl)imide (BMIM-TFSI), ethyl-3-methylimidazolium bis-trifluoromethylsulfonylimide (EMI-TFSI), pyrrolidinium bis(trifluoromethanesulfonyl)imide (Py-TFSI), piperidinium bis(trifluoromethylsulfonyl)imide (PP-TFSI), and combinations thereof, and the lithium salt is selected from the group consisting of: lithium tetrafluoroborate ($LiBF_4$), lithium perchlorate ($LiClO_4$), lithium hexafluorophosphate ($LiPF_6$), lithium hexafluoroarsenate ($LiAsF_6$), lithium trifluoromethanesulfonate (LiTf), lithium bis(fluorosulfonyl)imide (LiFSI), lithium bis(trifluoromethanesulfonyl)imide (LiTFSI), lithium bis(oxalato)borate (LiBOB), and combinations thereof.

* * * * *